US00RE44172E

(19) United States
(12) Reissued Patent
Murase et al.

(10) Patent Number: US RE44,172 E
(45) Date of Reissued Patent: Apr. 23, 2013

(54) ACCOMMODATING VESSEL AND IMAGE FORMING DEVICE USING THE SAME

(75) Inventors: Hirokazu Murase, Kanagawa (JP); Kei Hirata, Kanagawa (JP)

(73) Assignee: Fuji Xerox Co., Ltd., Tokyo (JP)

(21) Appl. No.: 13/451,159

(22) Filed: Apr. 19, 2012

Related U.S. Patent Documents

Reissue of:
(64) Patent No.: 7,937,029
Issued: May 3, 2011
Appl. No.: 12/422,729
Filed: Apr. 13, 2009

(30) Foreign Application Priority Data

Sep. 26, 2008 (JP) ..... P2008-248935

(51) Int. Cl.
*G03G 15/08* (2006.01)
*G03G 15/00* (2006.01)

(52) U.S. Cl.
USPC ..... 399/262; 399/110

(58) Field of Classification Search ..... 399/119, 399/258, 262, 263, 260, 110
See application file for complete search history.

(56) References Cited

U.S. PATENT DOCUMENTS 5,398,849 A * 3/1995 Smith et al. ..... 399/262
6,259,877 B1 7/2001 Taniyama et al.
7,460,819 B2 12/2008 Kaiho
7,483,656 B2 1/2009 Park
7,711,293 B2 5/2010 Koyama
2005/0196198 A1 9/2005 Kawamura et al.
2006/0291910 A1 12/2006 Choi et al.
2007/0086810 A1 4/2007 Yamada et al.
2008/0267670 A1 10/2008 Li et al.

FOREIGN PATENT DOCUMENTS

JP 537941 1/1978
JP 61161247 U 10/1986
JP 08095365 A 4/1996
JP 10203547 A 8/1998
JP 200010390 A 1/2000
JP 2007240663 A 9/2007

* cited by examiner

*Primary Examiner* — Susan Lee
(74) *Attorney, Agent, or Firm* — Morgan, Lewis & Bockius LLP

(57) ABSTRACT

An accommodating vessel, which is detachably attached to a vessel receiving part of a casing of an image forming device to accommodate an image forming material, the accommodating vessel including: a vessel main body that includes a tubular part; a cover member that includes a fitted part; at least one positioned protrusion; and at least one positioned positioning protrusion, wherein the at least one positioned protrusion includes: a guide protrusion that extends in a rotating direction of the cover member; and a plurality of rotation stop protrusions that extends in opposite directions to each other relative to the guide protrusion along a pushing and pulling direction of the cover member, and Wherein the positioning protrusion includes a stop wall that abuts on the guide protrusion and the plurality of rotation stop protrusions of the at least one positioned protrusion to be stopped.

9 Claims, 33 Drawing Sheets

A-A

B–B

C-C

D-D

CORRESPOND TO SECTIONAL PART ALONG LINE C-C

CORRESPOND TO SECTIONAL PART ALONG LINE D-D

ACCOMMODATING VESSEL AND IMAGE FORMING DEVICE USING THE SAME

Matter enclosed in heavy brackets [ ] appears in the original patent but forms no part of this reissue specification; matter printed in italics indicates the additions made by reissue.

CROSS-REFERENCE TO RELATED APPLICATIONS

This application is based on and claims priority under 35 U.S.C. 119 from Japanese Patent Application No. 2008-248935 filed Sep. 26, 2008.

BACKGROUND

1. Technical Field

The present invention relates to an accommodating vessel, and an image forming device using the same.

SUMMARY

According to an aspect of the present invention, an accommodating vessel, which is detachably attached to a vessel receiving part of a casing of an image forming device to accommodate an image forming material, the accommodating vessel including: a vessel main body that includes a tubular part with one opening opened in one end and in which the image forming material is accommodated; a cover member that includes a fitted part to which the tubular part of the vessel main body is detachably fitted, and that is pushed in to the tubular part so as to freely rotate to an attaching position; at least one positioned protrusion that is provided to protrude in the fitted part of the cover member, and that is used to position the cover member to a positioning place of the tubular part of the vessel main body; and at least one positioned positioning protrusion that is provided to protrude in the tubular part of the vessel main body, and that abuts on the at least one positioned protrusion to position the at least one positioned protrusion to a positioning place, wherein the at least one positioned protrusion includes: a guide protrusion that extends in a rotating direction of the cover member; and a plurality of rotation stop protrusions that extends in opposite directions to each other relative to the guide protrusion along a pushing and pulling direction of the cover member, and wherein the positioning protrusion includes a stop wall that abuts on the guide protrusion and the plurality of rotation stop protrusions of the at least one positioned protrusion to be stopped.

BRIEF DESCRIPTION OF THE DRAWINGS

Exemplary embodiment of the present invention will be described in detail based on the following figures, wherein.

DETAILED DESCRIPTION (Summary of Embodiment of the Invention)

Figure 1A:
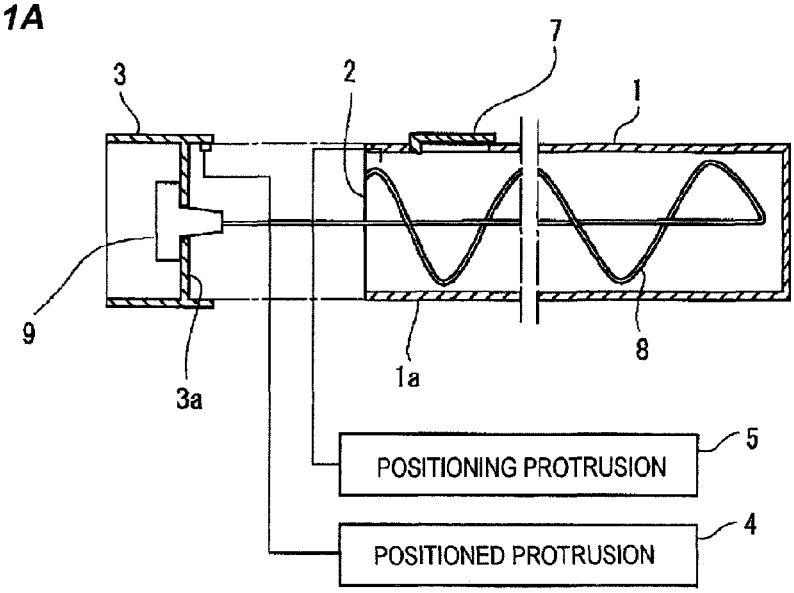
FIG. 1A is an explanatory view showing the summary of a developer accommodating vessel according to an embodiment to which the present invention is applied.

FIG. 1A shows a summary of an embodiment of an accommodating vessel to which the present invention is applied. The accommodating vessel mentioned herein widely includes a vessel for accommodating an image forming material as a material for forming an image. In a below-description, a developer accommodating vessel for accommodating a developer used in an electro-photographic system as the image forming material will be described as an example.

Further, such a developer accommodating vessel is detachably attached to a vessel receiving part of a casing of an image forming device and serves as parts for supplying the developer to, for instance, the image forming device.

In FIG. 1A, the developer accommodating vessel is detachably attached to the vessel receiving part of the casing of the image forming device to accommodate the developer and includes a vessel main body 1 that has a tubular part 1a with an opening 2 opened in a part thereof to accommodate the developer, a cover member 3 that has a part 3a to be fitted to which the tubular part 1a of the vessel main body 1 is detachably fitted and is pushed in to a predetermined attaching position so as to freely rotate relative to the tubular part 1a, and a positioning mechanism for positioning the cover member 3 to a predetermined positioning place of the tubular part 1a of the vessel main body 1 when the cover member 3 is attached to the vessel main body 1.

Figure 1B:
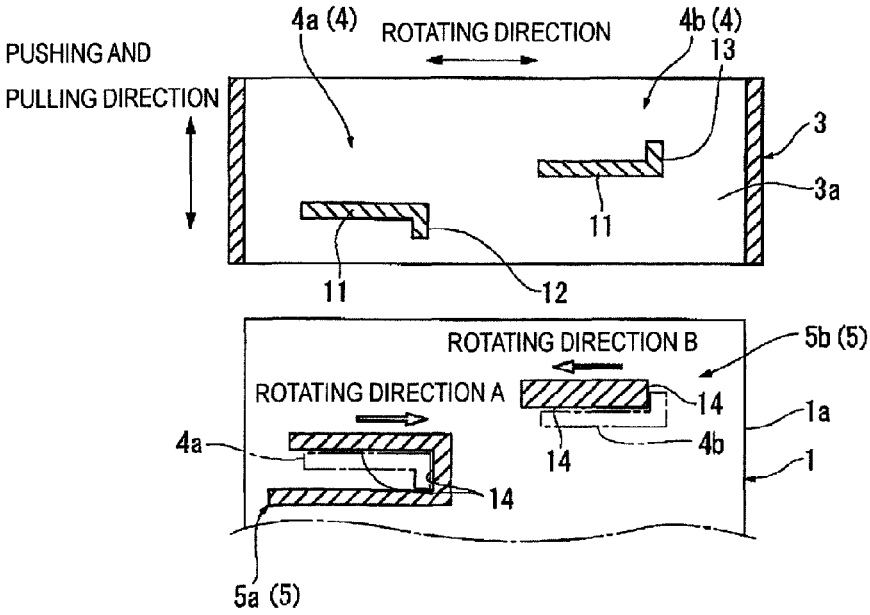
FIG. 1B is an explanatory view showing the summary of a positioning mechanism (positioned protrusion, positioning protrusion) shown in FIG. 1A.

Then, in this embodiment, the positioning mechanism includes, as shown in FIGS. 1A and 1B, a protrusion 4 to be positioned that is provided to protrude in the part 3a to be fitted of the cover member 3 and used to position the cover member 3 to the predetermined positioning place of the tubular part 1a of the vessel main body 1 and a positioning protrusion 5 that is provided to protrude in the tubular part 1a of the vessel main body 1, and abuts on the protrusion 4 to be positioned to position the protrusion 4 to be positioned to a predetermined positioning place. The protrusion 4 to be positioned includes guide protrusions 11 extending in the rotating direction of the cover member 3 and a plurality of rotation stop protrusions 12 and 13 extending in opposite directions to each other relative to the guide protrusions 11 along the pushing and pulling direction of the cover member 3. The positioning protrusion 5 includes stop walls 14 that abut on the guide protrusions 11 and the plurality of rotation stop protrusions 12 and 13 to be stopped.

In FIGS. 1A and 1B, reference numeral 7 designates an opening and closing mechanism provided in a part of the vessel main body 1 to supply the developer in the vessel main body 1 to the image forming device side when the developer accommodating vessel is attached to the casing of the image forming device. Reference numeral 8 designates a conveying member for agitating and conveying the developer in the vessel main body 1. Reference numeral 9 designates a rotating and connecting member that is attached to, for instance, the cover member 3 to transmit a rotating and driving force from an external driving source to the conveying member 8.

In the above-described technical unit, as the tubular part 1a of the vessel main body 1, it is to be understood that the vessel main body 1 may be tubular, or the tubular part 1a may be provided in a part of a non-tubular vessel main body 1.

Further, as the cover member 3, a cover member may be used that has a part 3a to be fitted to which the tubular part 1a of the vessel main body 1 is fitted and "is pushed in so as to freely rotate" relative to the tubular part 1a.

Further, as the positioning mechanism (the protrusion 4 to be positioned, the positioning protrusion 5), any positioning mechanism may be suitably selected that positions the cover member 3 and prevents the cover member 3 from rotating and from slipping off relative to the vessel main body 1 when the cover member 3 is attached to the tubular part 1a of the vessel main body 1.

Still further, the positioning mechanism (the positioned protrusion, the positioning protrusion) may be provided in one place, however, the positioning mechanism may be provided in a plurality of places from the viewpoint of stabilizing a positioning performance (a rotation prevention, a slip-off prevention) by the positioning mechanism, that is, a plurality of protrusions 4 to be positioned (for instance, 4a, 4b) and a plurality of positioning protrusions 5 (for instance, 5a, 5b) corresponding to the protrusions 4 to be positioned may be provided.

In such a form, since the plurality of the rotation stop protrusions 12 and 13 are provided, the contact areas of the rotation stop protrusions are more increased, so that a rotation preventing force to the cover member 3 is the more increased.

Further, since the plurality of the rotation stop protrusions 12 and 13 are extended in the opposite directions to each other along the pushing and pulling direction of the cover member 3, under a state that the cover member 3 is attached to the vessel main body 1, when the cover member 3 is detached from the vessel main body 1, for instance, if the cover member tries to be rotated toward a rotating direction A shown in FIG. 1B, the one rotation stop protrusion 12 is directly stopped by the stop wall 14 of the one positioning protrusion 5a. Further, the cover member 3 tries to be rotated in the rotating direction A, the cover member 3 is inclined relative to the vessel main body 1 on the part of the rotation stop protrusion as a supporting point. Then, under a state that the cover member 3 is inclined, the other rotation stop protrusion 13 is stopped by the stop wall 14 of the other positioning protrusion 5b.

When the cover member 3 tries to be rotated toward a rotating direction B shown in FIG. 1B relative to the vessel main body 1, the other rotation stop protrusion 13 is directly stopped by the stop wall 14 of the other positioning protrusion 5b. Then, under a state that the cover member 3 is inclined relative to the vessel main body 1 on the part of the rotation stop protrusion as a supporting point, the one rotation stop protrusion 12 is stopped by the stop wall 14 of the one positioning protrusion 5a.

Therefore, a sliding resistance due to the contact between the positioning protrusions 5 (5a, 5b) and the protrusions 4 to be positioned (4a, 4b) is increased, so that the cover member 3 is hardly slipped off and rotated relative to the vessel main body 1.

Here, as a representative form of a structure having a positioning mechanism provided in a plurality of places, a form may be exemplified in which all of the plurality of protrusions 4 to be positioned (4a, 4b) include the guide protrusions 11 and the rotation stop protrusions 12 or 13 and the rotation stop protrusion 12 of at least one protrusion 4 to be positioned (for instance, 4a) extends in a direction opposite to that of the rotation stop protrusion 13 of the other protrusion 4 to be positioned (for instance, 4b).

Further, as a preferred form of the protrusion 4 to be positioned, a form may be exemplified in which the positioned protrusion includes, separately from the rotation stop protrusion 12 or 13 in the guide protrusion 11, a butting protrusion (not shown in the drawing) that extends in the same direction as that of the rotation stop protrusion 12 or 13 and butts against the positioning protrusion 5 from the viewpoint of preventing the collapse of the protrusion 4 to be positioned relative to the positioning protrusion 5 under a state that the cover member 3 is attached to the vessel main body 1.

Still further, from the viewpoint of reducing a rotating and operating force of the cover member 3 when the cover member 3 is attached to the vessel main body 1, a form may be preferable in which at least either of the positioned protrusion and the positioning protrusion has a guide inclined part (not shown in the drawing) that is inclined so as to guide the rotation stop protrusion 12 or 13 of the protrusion 4 to be positioned in a direction for overriding the stop wall 14 of the positioning protrusion 5 in a part where the protrusion 4 to be positioned of the cover member 3 begins to come into contact with the positioning protrusion 5 of the vessel main body 1 in accordance with the rotation of the cover member 3.

Further, as a preferred form of the positioning protrusion 5, from the viewpoint of easily positioning the protrusion 4 to be positioned relative to the positioning protrusion 5, a form may be exemplified in which the positioning protrusion 5 of the vessel main body 1 includes a first positioning protrusion and a second positioning protrusion arranged so as to hold the protrusions 4 to be positioned of the cover member 3 between them in the pushing and pulling direction of the cover member 3 and the width of the first positioning protrusion and the second positioning protrusion in the direction orthogonal to the rotating direction of the cover member 3 is formed to be narrower as the cover member 3 is more rotated.

Now, the present invention will be more specifically described on the basis of an embodiment shown in the attached drawings.

First Embodiment (Entire Structure of Image Forming Device)

Figure 2:
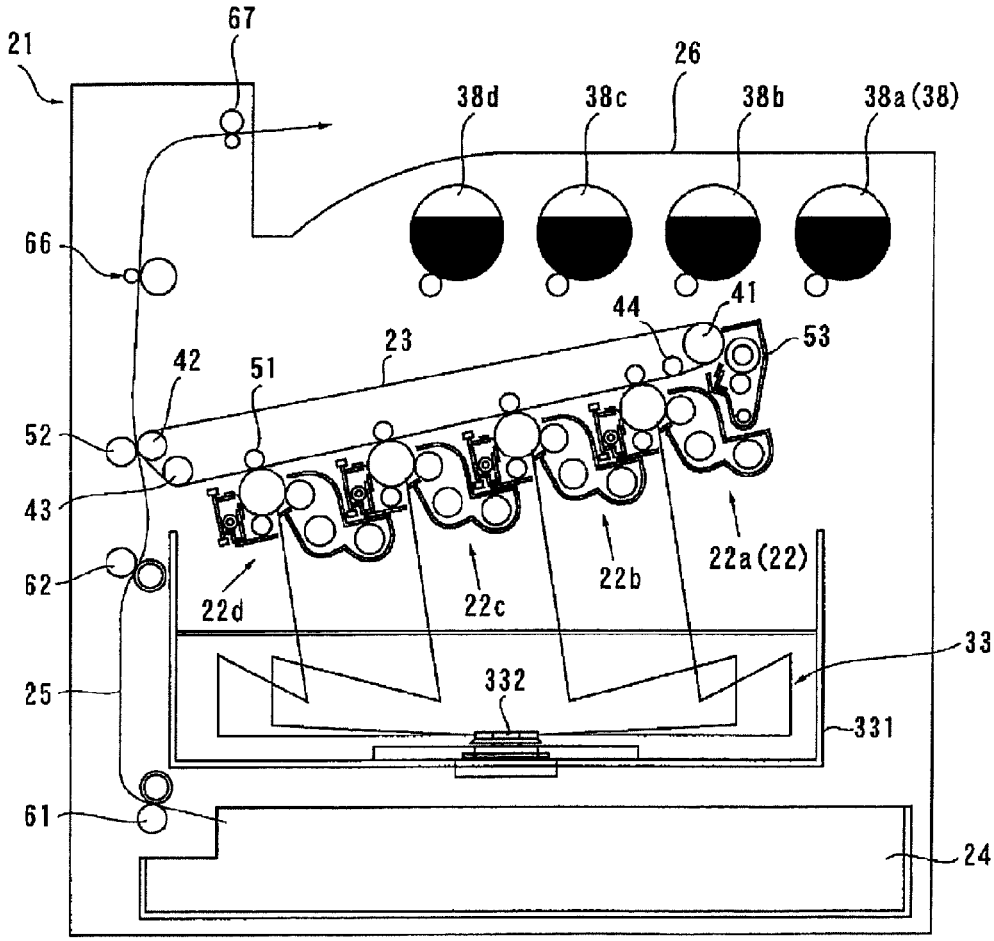
FIG. 2 is an explanatory view showing an entire structure of an image forming device according a first embodiment to which the present invention is applied.

FIG. 2 is an entire structure of a first embodiment of an image forming device to which the present invention is applied.

In FIG. 2, the image forming device has, in a casing 21 of the image forming device (refer it to as a device casing, hereinafter), image forming parts 22 (specifically, 22a to 22d) of four colors (in this embodiment, black, yellow, magenta and cyan) are arranged in a transverse direction with a slightly obliquely and upwardly inclined positional relation. In an upper part of the device casing 21, an intermediate transfer belt 23 is arranged that is circulated and conveyed along the arranging direction of the image forming parts 22 respectively. On the other hand, in a lower part of the device casing 21, a recording material supply device 24 is arranged in which recording materials are accommodated so as to be supplied. In the upper part of the device casing 21, a recording material delivering and receiving part 26 is provided in which recording materials on which imaged are formed are delivered and accommodated so that the recording materials from the recording material supply device 24 are delivered to the recording material delivering and receiving part 26 through a vertically extending recording material conveying path 25.

Figure 3:
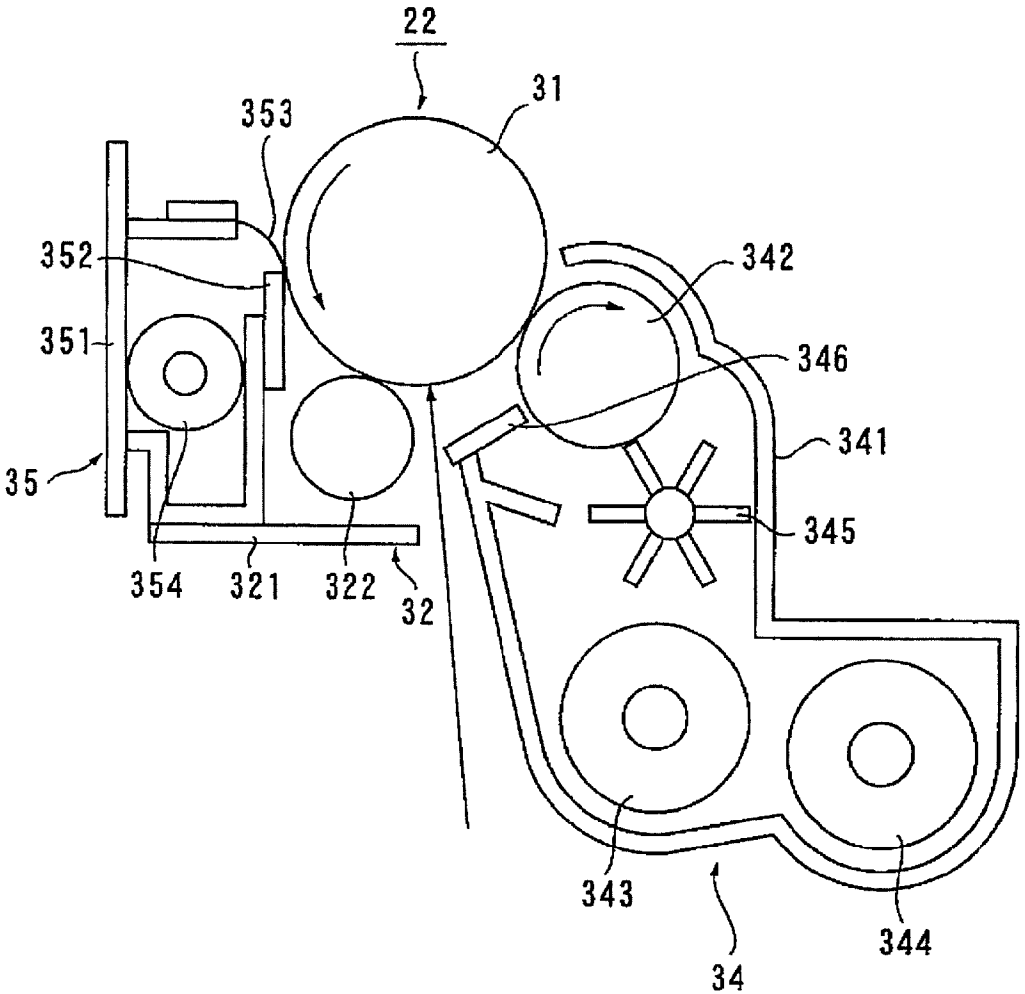
FIG. 3 is an explanatory view showing the detail of an image forming part of the image forming device shown in FIG. 2.

In this embodiment, the image forming parts 22 (22a to 22d) respectively form, as shown in FIGS. 2 and 3, for instance, toner images for black, yellow, magenta and cyan (an arrangement is not necessarily limited to the above-described order) in order from an upstream side in the circulating direction of the intermediate transfer belt 23. Each image forming part 22 includes, for instance, a photosensitive member 31 formed in a drum shape, a charger 32 for previously charging the photosensitive member 31, an exposure device 33 for writing an electrostatic latent image on the photosensitive member 31 charged by the charger 32, a developing device 34 for visualizing the electrostatic latent image on the photosensitive member 31 to a visible image by color toners respectively and a cleaner 35 for cleaning residual toner on the photosensitive member 31.

Here, the exposure device 33 is provided commonly to the image forming parts 22 respectively to deflect and scan lights from a light source such as a semiconductor laser (not shown in the drawing) of color components by a deflecting mirror 332 in an exposure vessel 331 and guide an optical image to a corresponding exposure position on the photosensitive member 31 through an image forming lens and a mirror not shown in the drawing.

Further, the intermediate transfer belt 23 is extended on stretching rolls 41 to 44, and, circulated and moved by, for instance, the stretching roll 41 as a driving roll. Then, on the back surface of the intermediate transfer belt 23 corresponding to each photosensitive member 31, a primary transfer device 51 (for instance, a primary transfer roll) is arranged. A voltage of a reversed polarity to a charged polarity of the toner is applied to the primary transfer device 51 to electro-statically transfer the toner image on the photosensitive member 31 to the intermediate transfer belt 23.

Further, at a part corresponding to the stretching roll 42 in the downstream side of the image forming part 22d located at the most downstream part in the moving direction of the intermediate transfer belt 23, a secondary transfer device 52 (for instance, a secondary transfer roll) is arranged to secondarily transfer (transfer together) a primary transfer image on the intermediate transfer belt 23 to the recording material.

Further, at a part corresponding to the stretching roll 41 in the downstream side of the secondary transfer part of the intermediate transfer belt 23, an intermediate cleaner 53 is provided for cleaning the residual toner on the intermediate transfer belt 23.

Here, the intermediate transfer belt 23 employs a resin such as polyimide, polycarbonate, polyester, polypropylene, etc. or various kinds of rubber including a suitable quantity of antistatic agent such as carbon black and is formed so as to have a volume resistivity of 106 to 1014 Ω.cm.

Further, in this embodiment, the recording materials supplied by a feeder 61 of the recording material supply device 24 are conveyed by the suitable number of conveying rolls (not shown in the drawing) in the recording material conveying path 25, aligned by an alignment roll 62, then, pass through the secondary transfer part of the secondary transfer device 52 to, for instance, heat, pressurize and fix a toner image to be fixed by a fixing device 66, and then, are delivered and received by the recording material delivering and receiving part 26 through a delivery roll 67.

In FIG. 2, reference numeral 38 (38a to 38d) designates a developer accommodating vessel (toner cartridge) for supplying new developer (in this embodiment, toner) to the developing device 34 of each image forming part 22 (22a to 22d).

(Image Forming Part)

Especially, in this embodiment, the photosensitive member 31 is formed as a process cartridge having the charger 32 and the cleaner 35 formed integrally therewith. This process cartridge is detachably attached to the device casing 21 to form a part of the image forming part 22 including color components respectively.

Here, the charger 32 includes a charging vessel 321 having an opening in a part opposed to the photosensitive member 31. In the charging vessel 321, a charging roll 322 is arranged that comes into contact with or comes close to the surface of the photosensitive member 31.

Further, the cleaner 35 has a cleaning vessel 351 has an opening in a part opposed to the photosensitive member 31. In one edge part of the opening along the longitudinal direction of the cleaning vessel 351, a cleaning blade 352 is provided that is made of an elastic scraping plate in contact with the photosensitive member 31. In the other edge part of the opening along the longitudinal direction of the cleaning vessel 351, an elastic seal material 353 is provided that comes into contact with the photosensitive member 31. In the cleaning vessel 351, a leveling and conveying member 354 is provided that levels a residual material such as the toner scraped out by the cleaning blade 352 along the longitudinal direction.

Further, in this embodiment, the developing device 34 is attached to the device casing 21 side separately from the process cartridge. The developing device 34 includes a developing vessel 341 that has an opening opposed to the photosensitive member 31 and in which the developer including at least the toner is accommodated. In the opening part of the developing vessel 341, a developer holder 342 is arranged that can convey the developer to a developing area located at apart opposed to the photosensitive member 31. In a rear surface side of the developer holder 342 in the developing vessel 341, a pair of developer agitating and conveying members 343 and 344 are arranged that can circulate, agitate ad convey the developer. Between the developer holder 342 and the developer agitating and conveying member 343 located in the developer holder 342 side, a developer supply member 345 is provided that can supply the agitated and conveyed developer to the developer holder 342 side. Further, the developer supplied to the developer holder 342 whose layer thickness is regulated to a prescribed layer thickness by a layer thickness regulating member 346 is supplied to the developing area.

(Developer Supply System)

Figure 4:
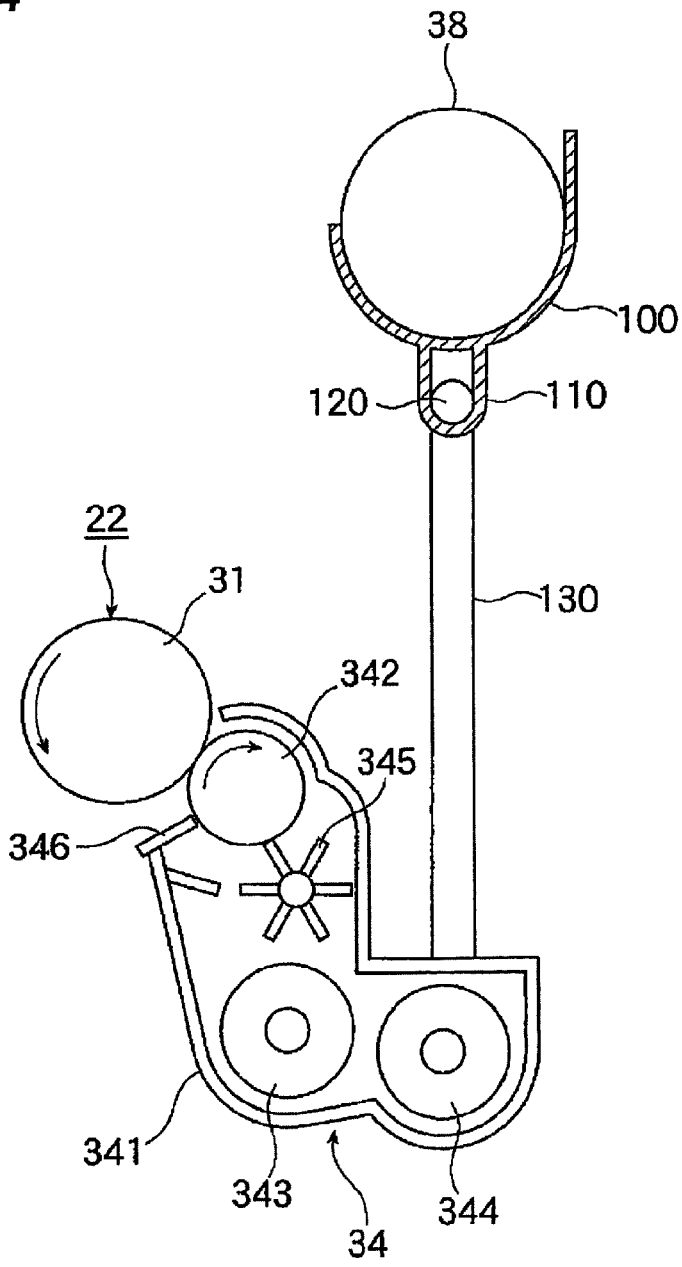
FIG. 4 is an explanatory view showing one example of a vessel receiving part of the developer accommodating vessel used in the image forming device shown in FIG. 2.

FIG. 4 shows one example of a developer supply system used in this embodiment.

In FIG. 4, the developer supply system is formed at a part of the device casing 21 and has a vessel receiving part 100 to which the developer accommodating vessel 38 is detachably attached. In a lower part of the vessel receiving part 100, a reserve tank 110 is arranged in which the developer to be supplied is temporarily stored. In the vessel receiving part 100, a discharge port not shown in the drawing is opened that can discharge the developer in the developer accommodating vessel 38 when the developer accommodating vessel 38 is attached to the vessel receiving art 100. In the reserve tank 110, a fixed quantity agitating and conveying member 120 is arranged that can supply a fixed quantity of the stored developer to supply a prescribed quantity of the developer to the developing vessel 341 of the developing device 34 through a duct 130 connected to a part of the reserve tank 110 on the basis of concentration information, for instance, the fall of the concentration of the developer.

(Developer Accommodating Vessel)

Figure 5:
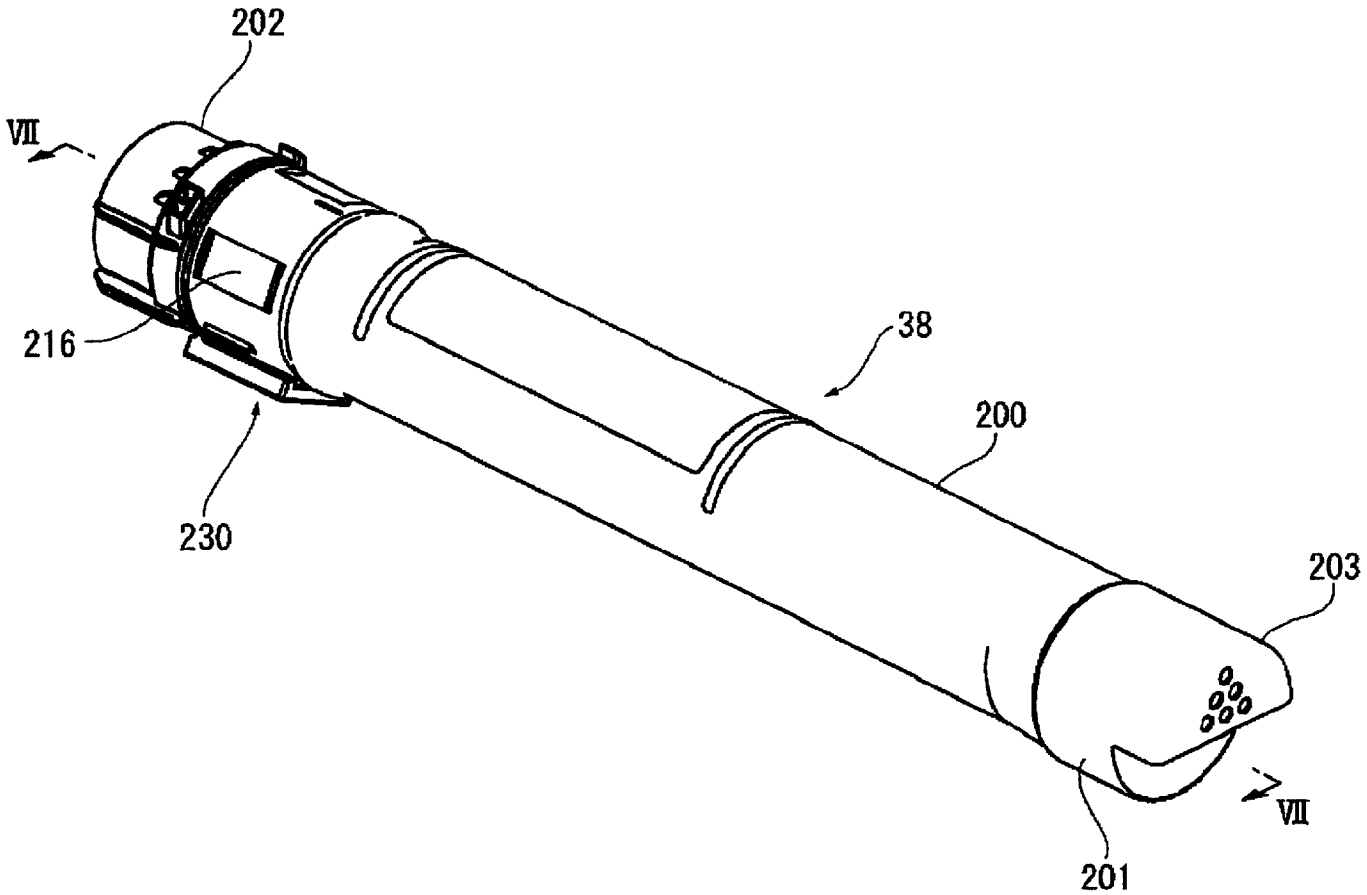
FIG. 5 is a perspective view showing the entire structure of the developer accommodating vessel used in the first embodiment.
Figure 6:
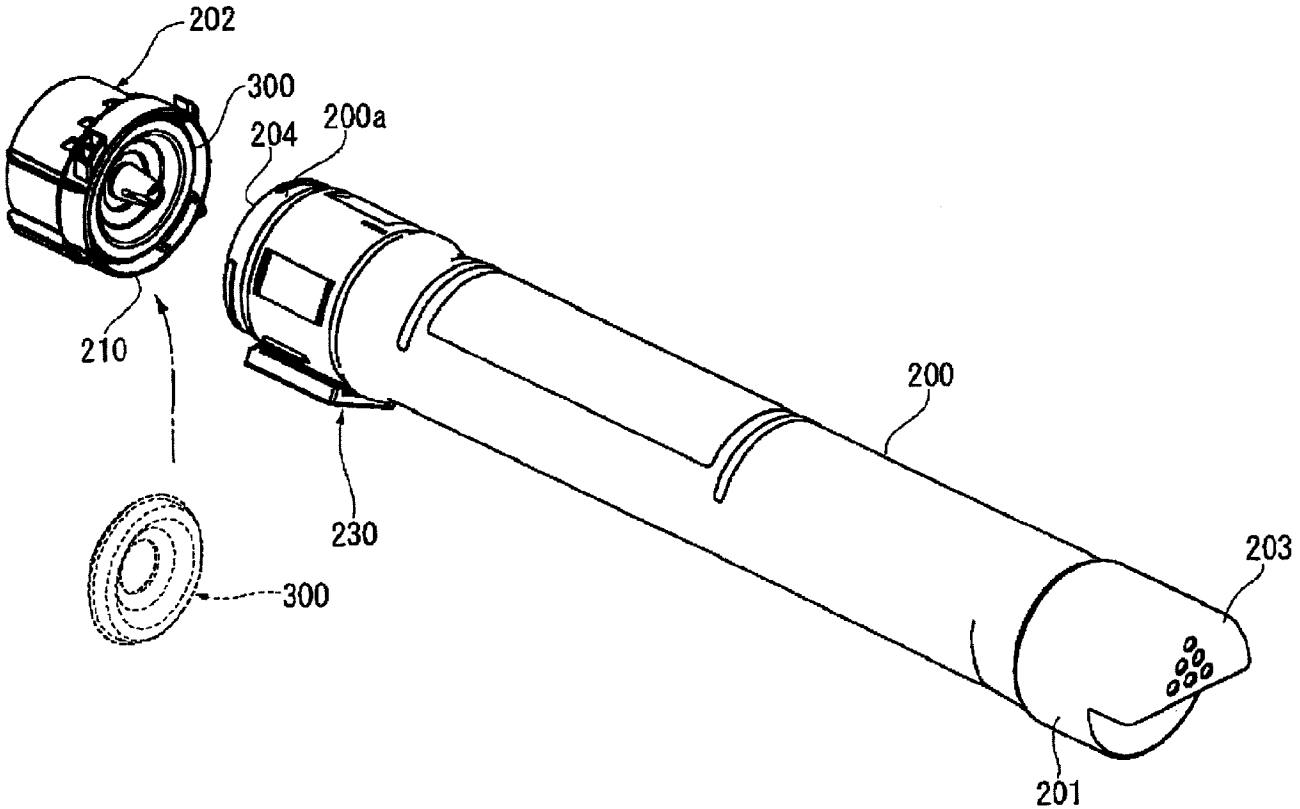
FIG. 6 is an explanatory view showing a state that a cover member is detached in the developer accommodating vessel shown in FIG. 5.
Figure 7:
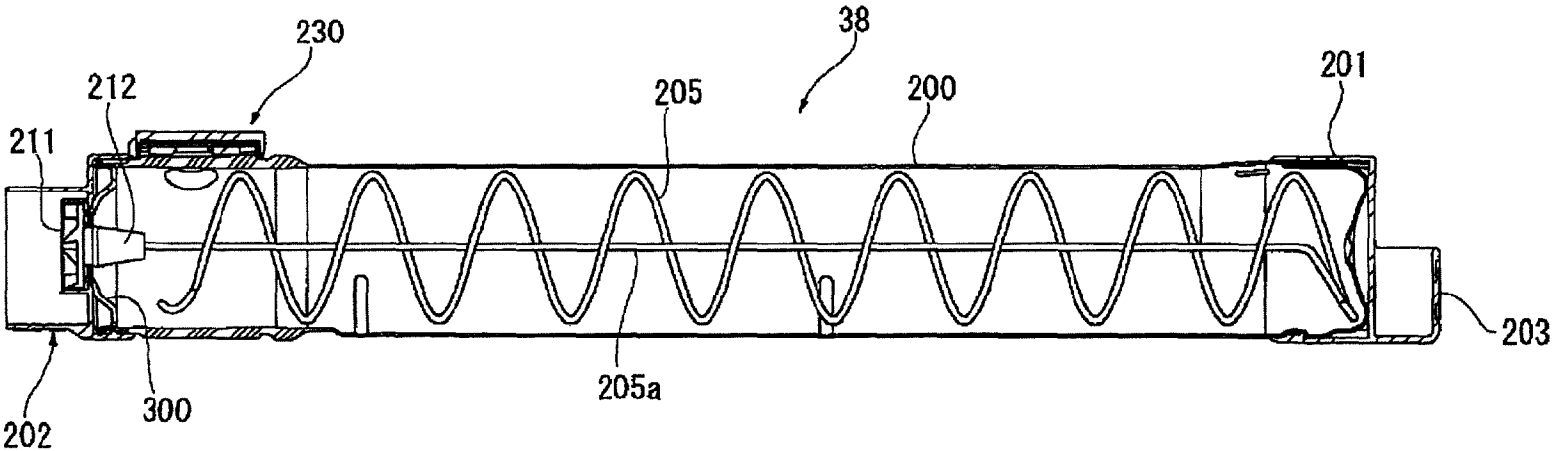
FIG. 7 is an explanatory view of a section along a line VII-VII in FIG. 5.

In this embodiment, the developer accommodating vessel 38 includes, as shown in FIGS. 5 to 7, a long tubular vessel main body 200 with both ends opened that is formed with a synthetic resin such as ABS, PET or the like by a draw and blow molding process. In the vessel main body 200, an agitator 205 is arranged as a conveying member capable of agitating the accommodated developer and end part flanges 201 and 202 as cover members are arranged in both the ends of the vessel main body 200. In this example, an opening 204 closed by the end part flange 202 is used as a developer supply port to which the developer can be supplied.

Here, in one end part flange 201, a gripping handle 203 is provided.

Further, in the other end part flange 202, a part 210 to be fitted made of a recessed part with a bottom is formed to which an end tubular part 200a of the vessel main body 200 is detachably fitted. The part 210 to be fitted includes a bottom wall 213 through which a rotating shaft of the agitator 205 passes and a peripheral wall 214 for surrounding the periphery of the agitator 205. The bottom wall 213 of the part 210 to be fitted includes a rotor 211 to which a driving shaft of an external driving source not shown in the drawing is connected. On a central part of an inner surface of the rotor 211, a hook part 212 is provided as a coupling member on which a rotating shaft part 205a of the agitator 205 is hooked and supported.

Figure 9:
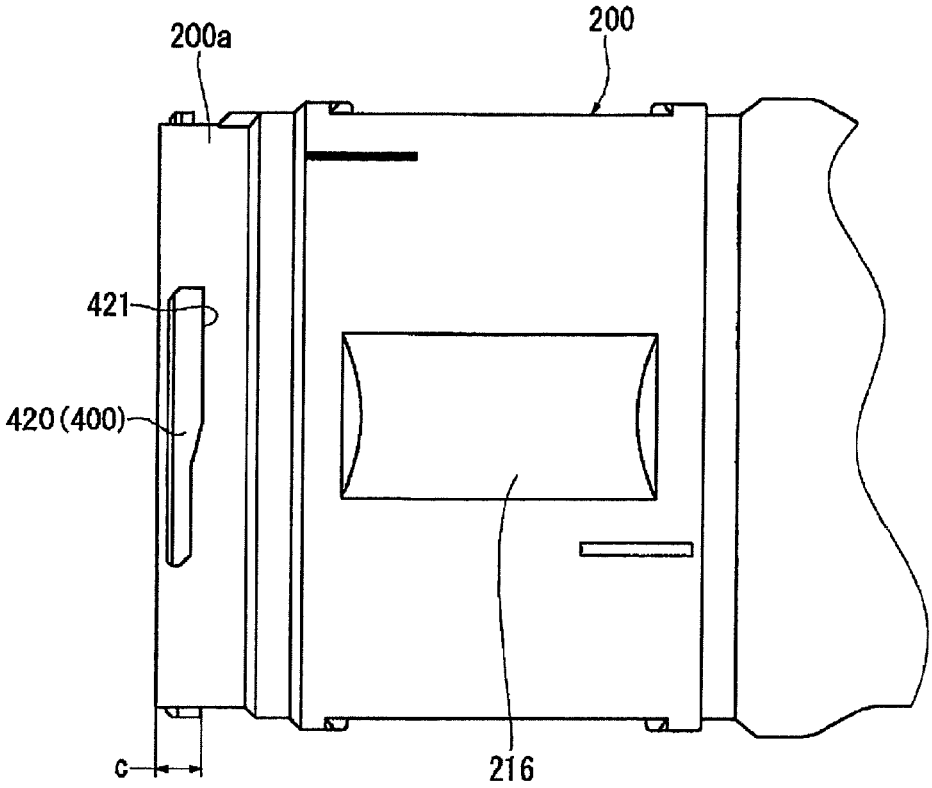
FIG. 9 is an explanatory view showing the detail of an opening edge of a vessel main body used in the first embodiment.
Figure 10A:
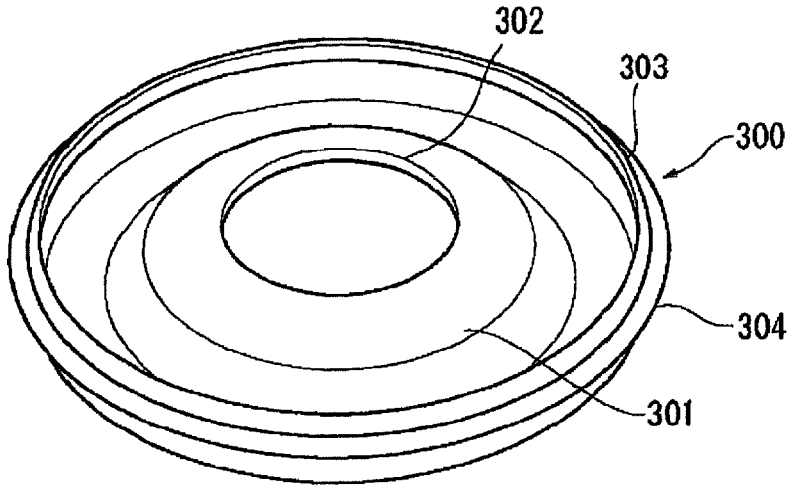
FIG. 10A is a perspective view showing the detail of a seal member used in the first embodiment.
Figure 10B:
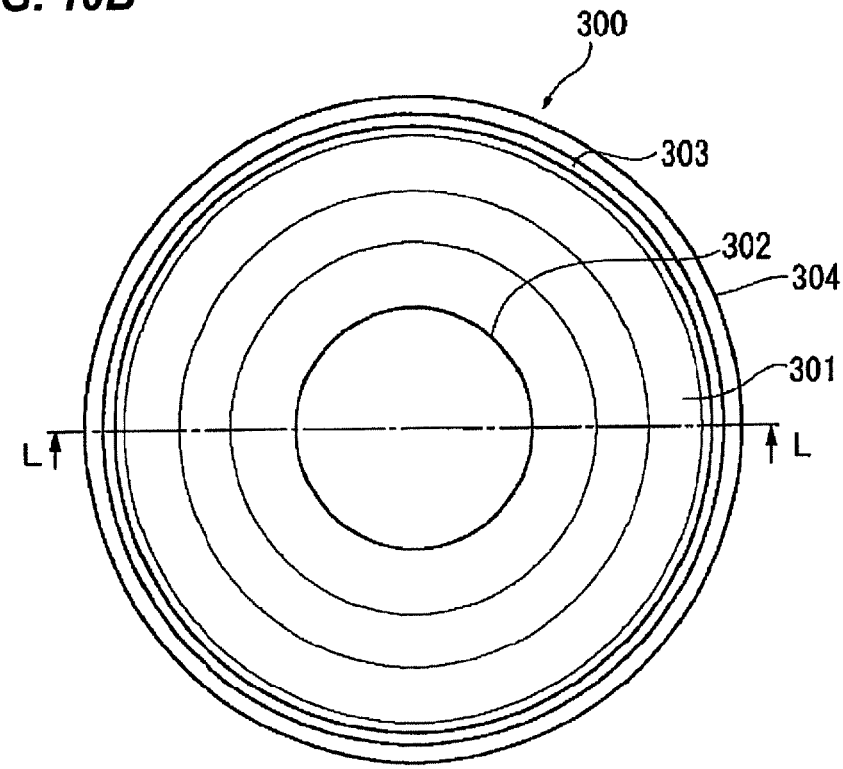
FIG. 10B is a plan explanatory view thereof.

In FIG. 9, 216 designates a non-volatile memory as a use history managing memory attached to a suitable part of the vessel main body 200 and is connected to communicated with a controller not shown in the drawing when the developer accommodating vessel 38 is attached to the vessel receiving part 100 to record the use history of the developer accommodating vessel 38.

(Seal Member)

Further, in this embodiment, between the end part flange 202 and the vessel main body 200, a seal member 300 is provided for sealing a part between both the members.

The seal member 300 is held in the part 210 to be fitted of the end part flange 202 in a preceding stage of an attached state that the end part flange 202 is attached to the vessel main body 200. That is, the end part flange 202 is formed in a state before an attachment of holding the seal member 300 in the preceding stage of the attached state.

Then, the seal member 300 is integrally formed by an elastic material such as polyethylene, polypropylene or the like. The seal member includes, as shown in FIGS. 10A and 10B, FIGS. 11A and 11B and FIG. 12, an annular main body part 301 that is accommodated in the part 210 to be fitted and through which the rotating shaft of the agitator 205 (in this example, the hook part 212 as the coupling member on which the rotating shaft part 205a of the agitator 205 is supported) passes. In the inner edge and the outer edge of the annular main body part 301, sealing butting pieces (an inner edge sealing butting piece, an outer edge sealing butting piece) 302 and 303 are formed that abut on the bottom wall 213 of the part 210 to be fitted. In an outer edge of the annular main body part 301, a sealing butting piece (a peripheral edge sealing butting piece) 304 is formed that abuts on the peripheral wall 214 of the part 210 to be fitted.

Figure 11A:
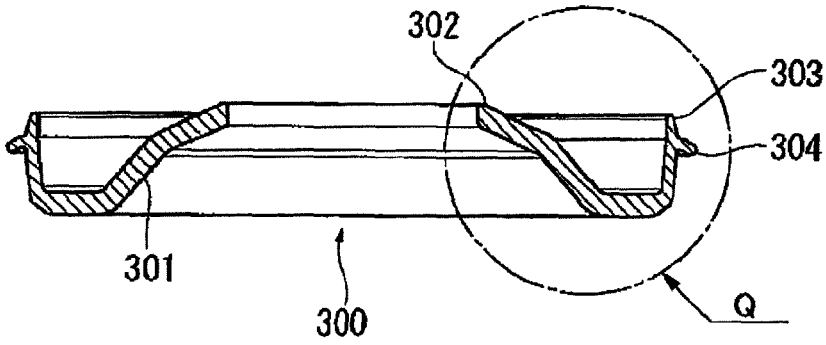
FIG. 11A is an explanatory view of a section taken along a line L-L in FIG. 10B.
Figure 11B:
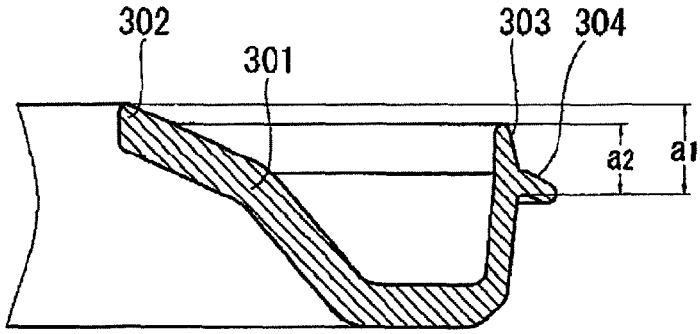
FIG. 11B is an enlarged view showing the detail of a part Q in FIG. 11A.

Here, a state is supposed that the seal member 300 is held in the part 210 to be fitted of the end part flange 202 under a condition that the end part flange 202 is in a preceding state of an attachment. In this case, as shown in FIGS. 11A and 11B, assuming that dimensions of the sealing butting pieces 302 and 303 in the pushing and pulling direction of the end part flange 202 by using the base part of the peripheral edge sealing butting piece 304 as a starting point are a1 and a2, a1 and a2 are set so as to satisfy a relation of a1>a2.

(Positioning Mechanism)

Figure 8:
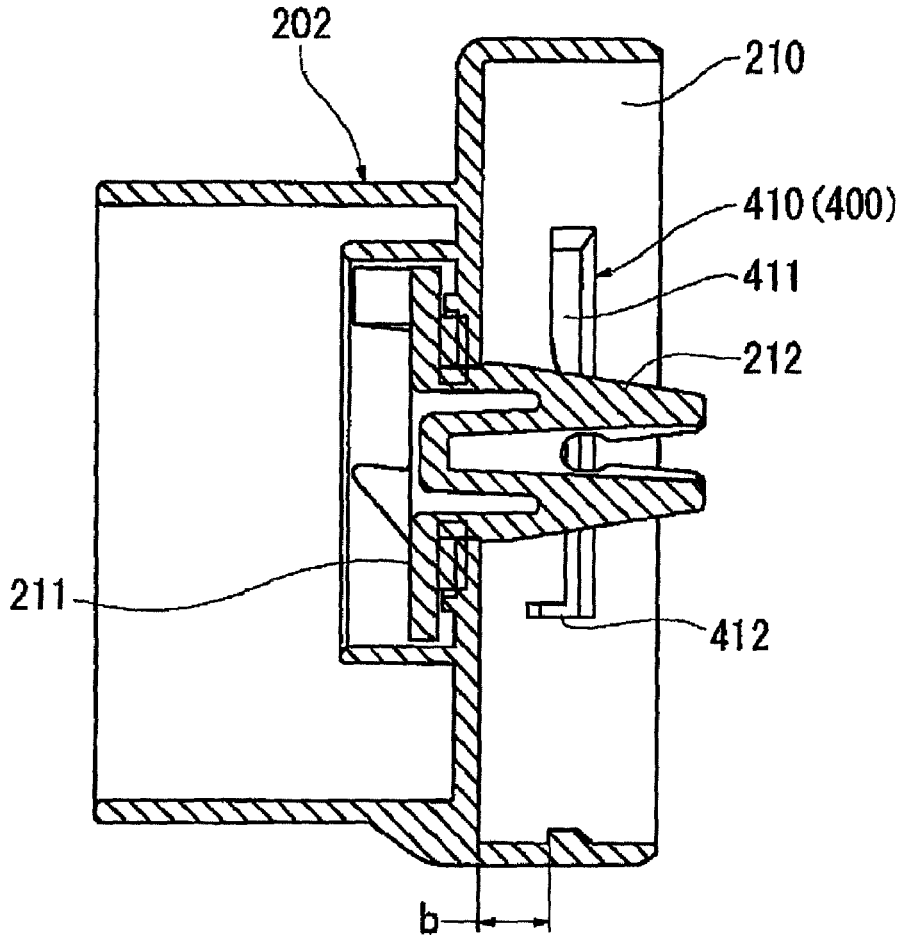
FIG. 8 is an explanatory view s of a section showing the detail of the cover member (end part flange) used in the first embodiment.

In this embodiment, as shown in FIG. 8, between the end tubular part 200a of the vessel main body 200 and the part 210 to be fitted of the end part flange 202, a positioning mechanism 400 is provided for positioning both the members when the end part flange 202 is attached to an attaching position relative to the end tubular part 200a of the vessel main body 200.

The positioning mechanism 400 includes a protrusion 410 to be positioned that is formed to protrude in the peripheral wall 214 of the part 210 to be fitted of the end part flange 202 and used to position the end part flange 202 to a predetermined positioning place of the end tubular part 200a of the vessel main body 200 and a positioning protrusion 420 (see FIG. 9) that is provided to protrude on the outer peripheral wall of the end tubular part 200a of the vessel main body 200 and abuts on the protrusion 410 to be positioned to position the protrusion 410 to be positioned to the predetermined positioning place. The protrusion 410 to be positioned or the positioning protrusion 420 may be respectively formed integrally with the end part flange 202 and the vessel main body 200, or separate members may be fixed thereto.

(Positioned Protrusion)

Figure 16:
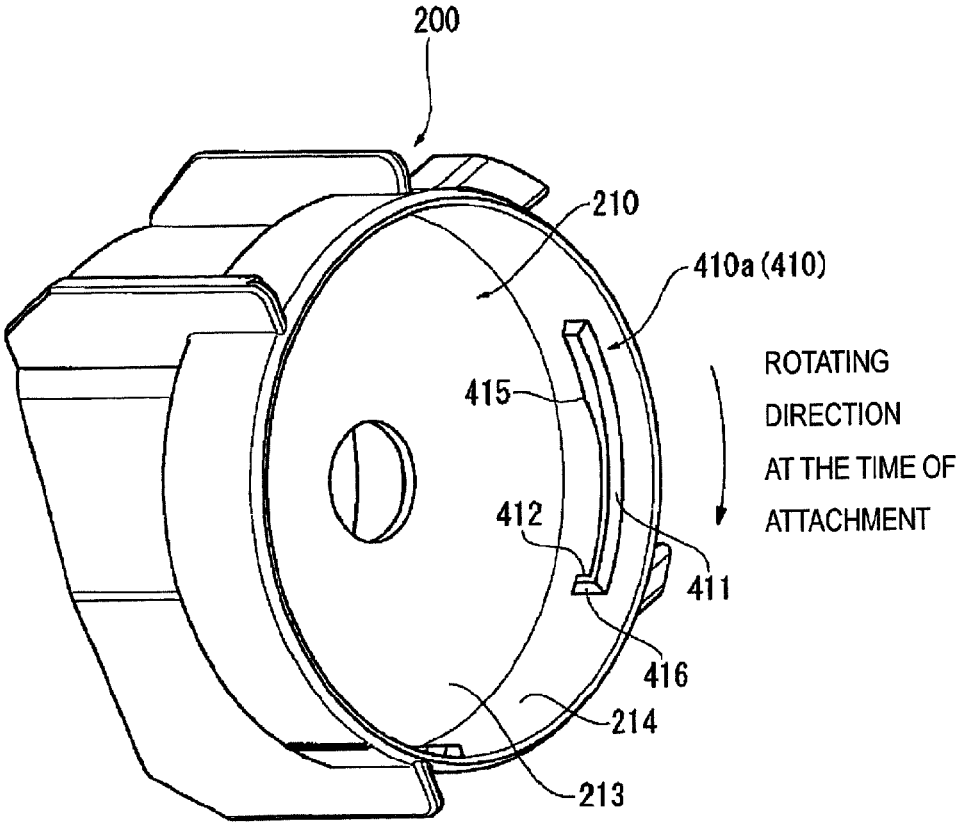
FIG. 16 is an explanatory view showing the detail of a first positioned protrusion of the positioning mechanism used in this embodiment.
Figure 17:
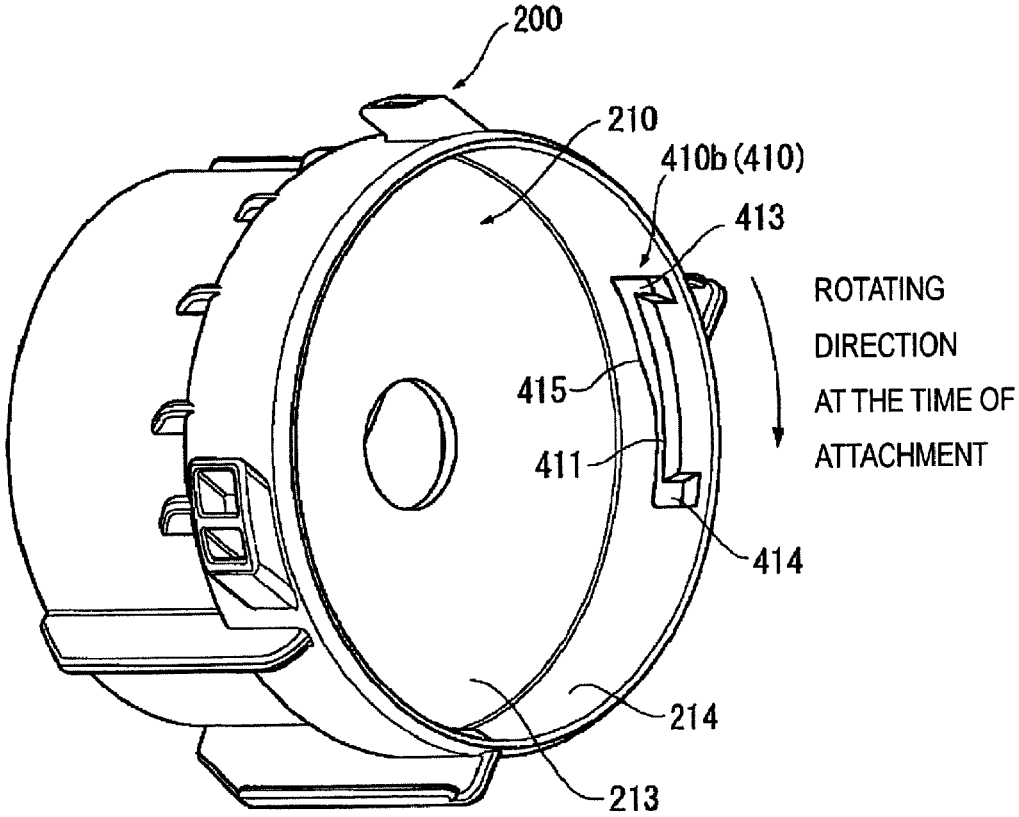
FIG. 17 is an explanatory view showing the detail of a second positioned protrusion of the positioning mechanism used in this embodiment.

Then, in this embodiment, the protrusion 410 to be positioned is, as shown in FIGS. 8, 16 and 17, provided in a plurality of places (in this example, two) on the peripheral wall 214 of the part 210 to be fitted of the end part flange 202.

Here, a first protrusion 410a (410) to be fitted includes, as shown in FIGS. 8 and 16, includes for instance a guide protrusion 411 extending along the rotating direction of the end part flange 202 and a rotation stop protrusion 412 extending from one end side of the guide protrusion 411 to the pushing and pulling direction of the end part flange 202.

In this example, in the guide protrusion 411, a half part of a rotating direction side at the time of attaching the end part flange 202 extends substantially with the same width dimension, and a side surface of the bottom wall 213 of the part 210 to be fitted as a half part in an opposite side has a guide surface 415 gradually swelling toward an opposite side in the rotating direction at the time of an attachment.

Further, the rotation stop protrusion 412 is provided in a side end part of the guide protrusion 411 in the rotating direction at the time of the attachment when the end part flange 202 is attached to the vessel main body 200 and extends toward the bottom wall 213 of the part 210 to be fitted from the guide protrusion 411. Then, the side end part of the rotation stop protrusion 412 in the rotation direction at the time of attaching the end part flange 202 is provided with a guide inclined part 416 inclined in a tapered form toward an end side.

Further, a second protrusion 410b (410) to be fitted includes, as shown in FIGS. 8 and 17, a guide protrusion 411 extending along the rotating direction of the end part flange 202 and a rotation stop protrusion 413 extending toward the pushing and pulling direction of the end part flange 202 from one end side of the guide protrusion 411 and toward an opposite direction to that of the rotation stop protrusion 412 of the first protrusion 410a to be positioned.

In this example, in the guide protrusion 411, a half part of a rotating direction side at the time of attaching the end part flange 202 extends substantially with the same width dimension, and a side surface of the bottom wall 213 of the part 210 to be fitted as a half part in an opposite side has a guide surface 415 gradually swelling toward an opposite side in the rotating direction at the time of an attachment.

Further, the rotation stop protrusion 413 is provided in a side end part of the guide protrusion 411 in the rotating direction at the time of the attachment when the end part flange 202 is attached to the vessel main body 200 and extends from the guide protrusion 411 toward a direction separating from the bottom wall 213 of the part 210 to be fitted.

Still further, the second protrusion 410b to be fitted includes a butting protrusion 414 extending toward the pushing and pulling direction of the end part flange 202 from an end part of the guide protrusion 411 opposite to the rotation stop protrusion 413 and in the same direction as that of the rotation stop protrusion 413.

(Positioning Protrusion)

Figure 18:
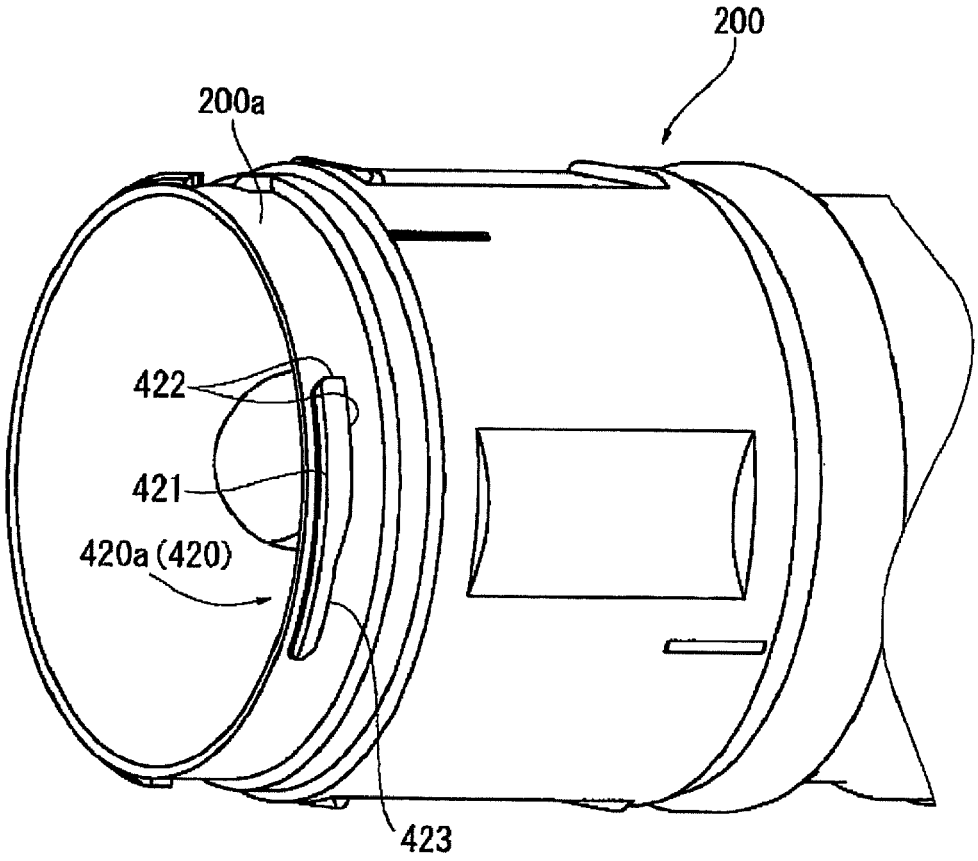
FIG. 18 is an explanatory view showing the detail of a first positioning protrusion of the positioning mechanism used in this embodiment.
Figure 19:
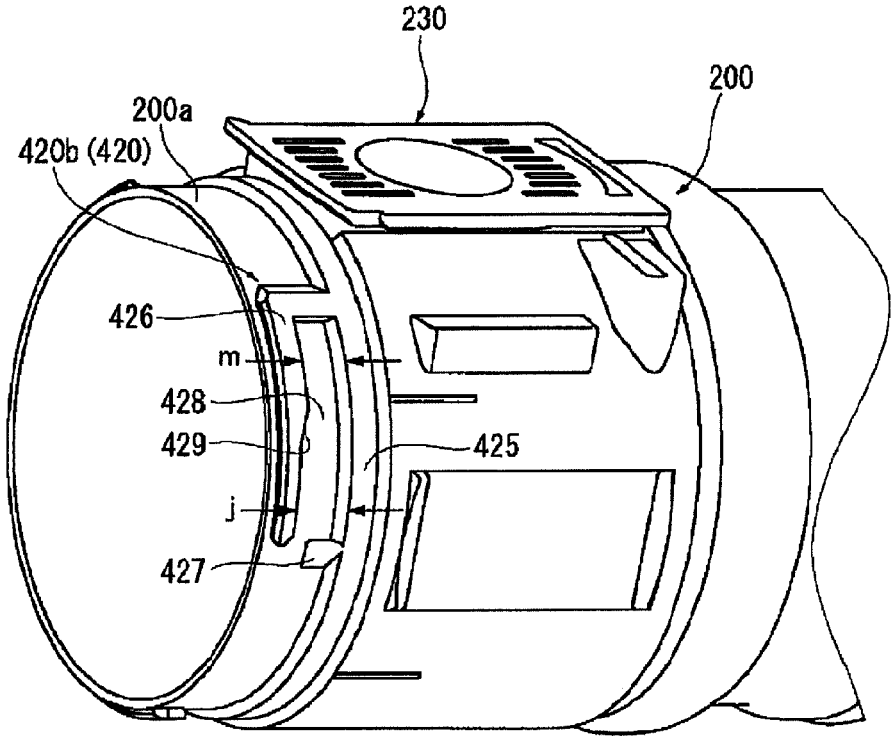
FIG. 19 is an explanatory view showing the detail of a second positioning protrusion of the positioning mechanism used in this embodiment.

On the other hand, in the positioning protrusion 420, as shown in FIGS. 9, 18 and 19, a plurality of positioning protrusions (in this example, two) are provided correspondingly to the plurality of protrusions 410 (410a, 410b) to be fitted.

A first positioning protrusion 420a (420) includes, as shown in FIGS. 9 and 18 and 19, a positioning protrusion 421 extending along the direction of the circumference of the end tubular part 200a of the vessel main body 200. The positioning protrusion 421 includes a stop wall 422 that abuts on the guide protrusion 411 and the rotation stop protrusion 412 of the first protrusion 410a (410) to be fitted to be stopped, and further includes a guide surface 423 along the guide surface 415 of the first protrusion 410a to be fitted.

Further, a second positioning protrusion 420b (420) includes, as shown in FIGS. 9 and 19, a positioning partition wall 426 protruding substantially in an L shape from a stepped annular part 425 formed in an annular shape along the periphery of the end tubular part 200a. In the opening side of the positioning partition wall 426, a separate partition wall 427 is provided that is separated with an opening remaining in apart. A partition area 428 surrounded by the stepped annular part 425, the positioning partition wall 426 and the separate partition wall 427 is set as an accommodating area of the second protrusion 410b to be fitted, and a peripheral wall for surrounding the partition area 428 is allowed to function as the stop wall 422 on which the guide protrusion 411, the rotation stop protrusion 413 and the butting protrusion 414 abut to be stopped. In an inner side surface of the positioning partition wall 426, a guide surface 423 is provided along a guide surface 415 of the second protrusion 410b to be fitted.

Then, in this example, in an outer side of the partition area 428 of the separate partition wall 427, a guide inclined part 429 tapered outward is formed.

Further, in this example, in the partition area 428, a partition area width j located in an opposite side to a rotating direction side is ensured to be wider than a partition area width m located in the rotating direction side at the time of attaching the end part flange 202.

Here, in the layout of the protrusion 410 to be fitted and the positioning protrusion 420, as shown in FIGS. 8 and 9, a dimension between a surface to be positioned of the guide protrusion 411 of the protrusion 410 to be positioned of the part 210 to be fitted of the end part flange 202 and the bottom wall 213 of the part 210 to be fitted is set to b. A dimension from an end of the end tubular part 200a of the vessel main body 200 to a positioning surface of the positioning protrusion 420 corresponding to the surface to be positioned of the guide protrusion 411 of the protrusion 410 to be positioned is set to c.

In this embodiment, the second positioning protrusion 420b(420) forms the partition area 428, however, the present invention is not limited thereto. A selection may be suitably made, for instance, the separate partition wall 427 may be removed or the positioning partition wall 426 may be separated from the stepped annular part 425.

(Attached State of Seal Member in Embodiment)

(1) State Before Attachment

Figure 12B:
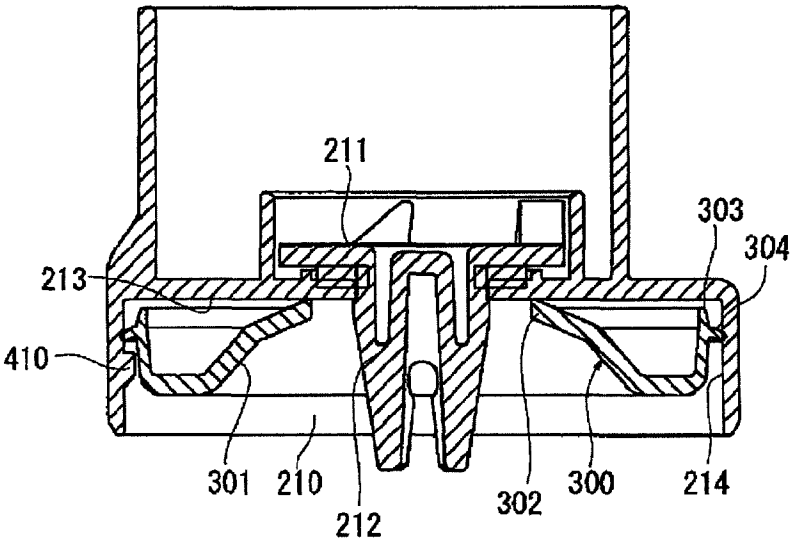
FIG. 12B is an explanatory view of a section taken along a line P-P in FIG. 12A.
Figure 12A:
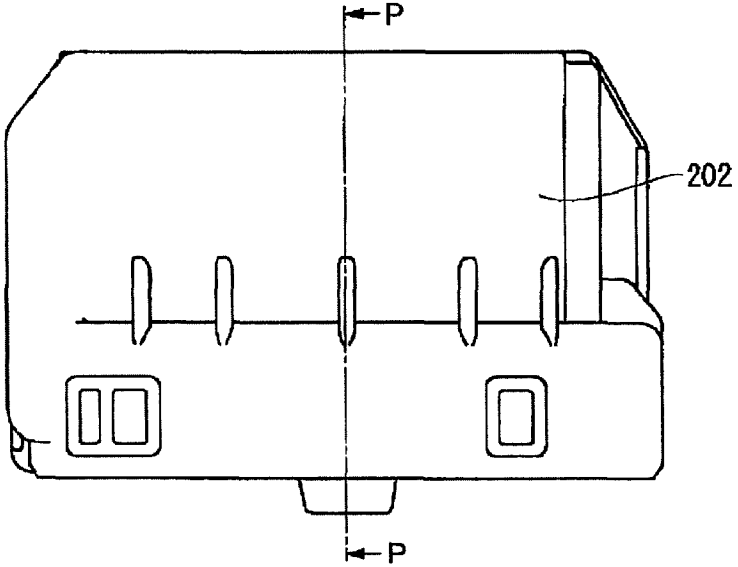
FIG. 12A is an explanatory view showing the cover member in a state before an attachment in which the seal member is held in the developer accommodating vessel according to the first embodiment.

As shown in FIGS. 12A and 12B, under a state before the end part flange 202 is attached to the vessel main body 200, the seal member 300 is held in the part 210 to be fitted of the end part flange 202. At this time, since a dimensional relation of a1 and a2 between the inner edge sealing butting piece 302 and the outer edge sealing butting piece 303 of the seal member 300 is set to such a relation as shown in FIG. 11B, the inner edge sealing butting piece 302 of the seal member 300 is arranged to come into contact with the bottom wall 213 of the part 210 to be fitted. However, the outer edge sealing butting piece 303 of the seal member 300 is arranged so as not to come into contact with the bottom wall 213 of the part 210 to be fitted. The peripheral edge sealing butting piece 304 of the seal member 300 is arranged to come into contact with the peripheral wall 214 of the part 210 to be fitted.

Accordingly, under the state before the end part flange 202 is attached to the vessel main body 200, the outer edge sealing butting piece 303 of the seal member 300 does not come into contact with the bottom wall 213 of the part 210 to be fitted, even when the seal member 300 is held for a long period in the state before an attachment, the outer edge sealing butting piece 303 is not elastically deformed. Thus, a deterioration of a form such as a state that the outer edge sealing butting piece 303 is deformed is not observed as compared with a case that, for instance, the outer edge sealing butting piece 303 is stored for a long period under a state that the outer edge sealing butting piece 303 is elastically deformed.

In this embodiment, as shown in FIG. 12B, the seal member 300 in a state before the attachment is held in the part 210 to be fitted of the end part flange 202. At this time, the protrusion 410 to be positioned of the positioning mechanism 400 functions as a stopper for preventing the seal member 300 from slipping out.

(2) Attached State

Figure 13:
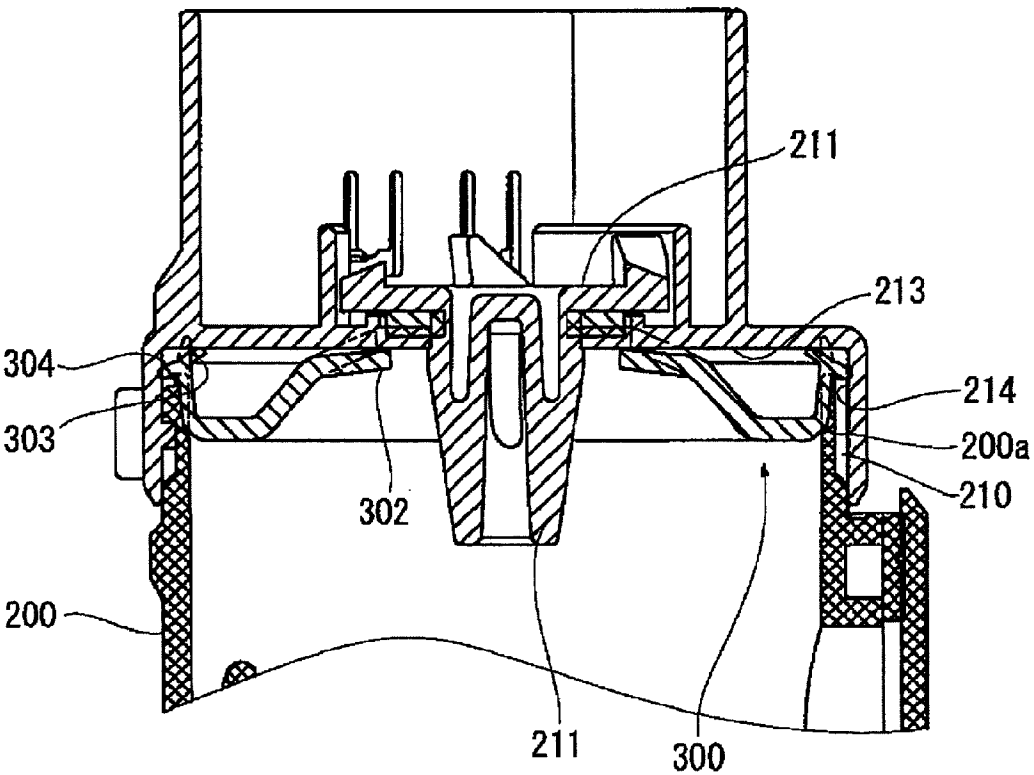
FIG. 13 is an explanatory view showing the operation of the seal member in an attached state that the cover member is attached to the vessel main body in the developer accommodating vessel according to the first embodiment.

An attached state of the seal member 300 under an attached state that the end part flange 202 is attached to the end tubular part 200a of the vessel main body 200 will be described by referring to FIG. 13.

In this embodiment, the dimensional relation a1 and a2 (see FIG. 11) between the inner edge sealing butting piece 302 and the outer edge sealing butting piece 303 of the seal member 300 and the dimensions b and c (see FIGS. 8 and 9) of the protrusion 410 to be positioned and the positioning protrusion 420 satisfy relations of a1>b−c, a2>b−c and a1>a2 at this time.

At this time, 'b−c' means a distance from the bottom wall 213 of the part 210 to be fitted of the end part flange 202 to the position of the end tubular part 200a of the vessel main body 200, and the seal member 300 held by the part 210 to be fitted is pressed to 'b−c' by the end tubular part 200a of the vessel main body 200. Therefore, under a state that the inner edge sealing butting piece 302 having the dimension of a1 and the outer edge sealing butting piece 303 having the dimension a2 in the state before the attachment are elastically deformed to 'b−c', the inner and outer sealing butting pieces 302 and 303 are arranged to come into contact with the bottom wall 213 of the part 210 to be fitted.

Under this state, since all the sealing butting pieces 302 to 304 of the seal member 300 are arranged so as to elastically come into contact with the bottom wall 213 and the peripheral wall 214 of the part 210 to be fitted, not only triple sealing parts by elastic contacts are obtained between the sealing butting pieces 302 to 304 and the wall surfaces of the part 210 to be fitted, but also a sliding resistance due to the elastic contacts of the sealing butting pieces 302 to 304 is obtained.

Accordingly, even when a user erroneously rotates the attached end part flange 202, since the sliding resistance by the sealing butting pieces 302 and 304 acts, there is no fear that the end part flange 202 is erroneously rotated or erroneously opened.

(Attached State of Seal Member in Comparative Embodiment)

Now, a seal member 300' will be used as a comparative embodiment in place of the seal member 300 used in this embodiment to describe a state of the seal member 300' before an attachment and the attached state of the seal member 300' in a state of an attachment.

Figure 14B:
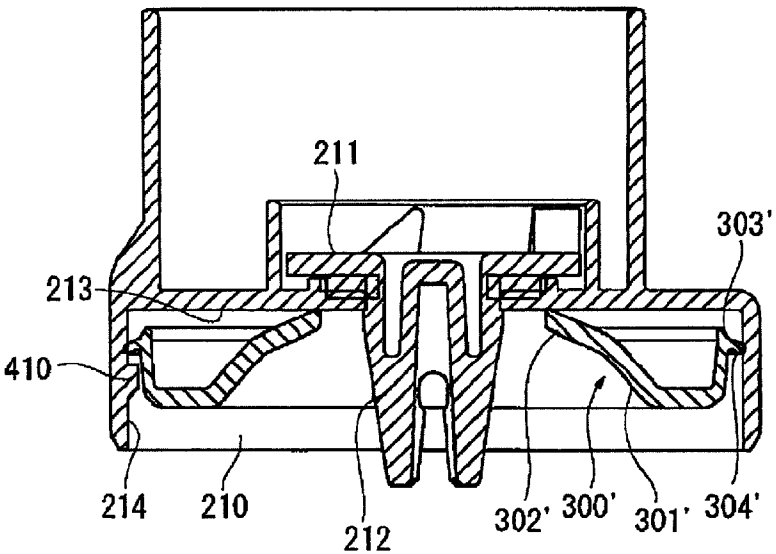
FIG. 14B is an explanatory view of a section taken along a line P-P in FIG. 14A.
Figure 14A:
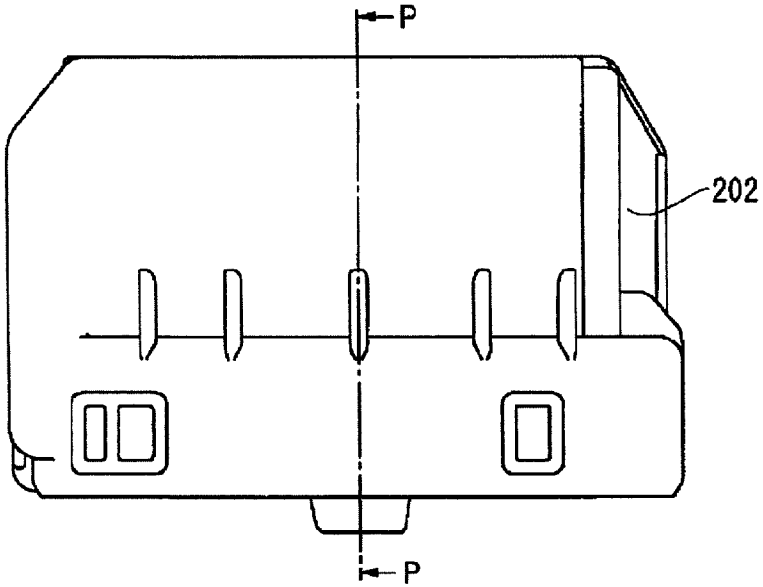
FIG. 14A is an explanatory view showing a cover member in a state before an attachment in which a seal member is held in a developer accommodating vessel according to a comparative embodiment.

In this comparative embodiment, the seal member 300' includes, as shown in FIGS. 14A and 14B, an annular main body part 301' accommodated in the part 210 to be fitted of the end part flange 202. In an inner edge of the annular main body part 301', an inner edge sealing butting piece 302' is provided that elastically comes into contact with the bottom wall 213 of the part 210 to be fitted. On an outer edge of the annular main body part 301', a protruding piece 303' (rib) is provided that pushes to an interior of the part 210 to be fitted. Further, in a peripheral edge of the annular main body part 301', a peripheral edge sealing abutting piece 304' is provided that elastically comes into contact with the peripheral wall 214 of the part 210 to be fitted.

Here, when the dimensional relation between the inner edge sealing butting piece 302' and the protruding piece 303' of the seal member 300' is respectively set to a1 and a2 like the first embodiment (however, the protruding piece 303' is functionally different from the outer edge sealing butting piece 303 of the first embodiment, however, the dimensional relation of the protruding piece 303' is allowed to correspond to that of the outer edge sealing butting piece 303 as shown in FIG. 11) and the dimensional relation between the protrusion 410 to be fitted and the positioning protrusion 420 is respectively set to b and c (see FIGS. 8 and 9), relations of a1>b−c, a2≦b−c, and a1>a2 at this time are allowed to be satisfied.

(1) State Before Attachment

As shown in FIGS. 14A and 14B, under a state before the end part flange 202 is attached to the vessel main body 200, the seal member 300' is held in the part 210 to be fitted of the end part flange 202. At this time, since a dimensional relation of a1 and a2 between the inner edge sealing butting piece 302' and the protruding piece 303' of the seal member 300' is set to a1>a2, the inner edge sealing butting piece 302' of the seal member 300' is arranged to come into contact with the bottom wall 213 of the part 210 to be fitted. However, the protruding piece 303' of the seal member 300' is arranged so as not to come into contact with the bottom wall 213 of the part 210 to be fitted. The peripheral edge sealing butting piece 304' of the seal member 300' is arranged to come into contact with the peripheral wall 214 of the part 210 to be fitted.

Accordingly, in this comparative embodiment, the attached state of the seal member 300' before the attachment is substantially the same as that of the embodiment.

(2) Attached State

An attached state of the seal member 300' under an attached state that the end part flange 202 is attached to the end tubular part 200a of the vessel main body 200 will be described by referring to FIG. 15.

In this case, the dimensional relations (a1, a2, b, c) of the seal member 300' are respectively the same as those described above. At this time, 'b−c' means a distance from the bottom wall 213 of the part 210 to be fitted of the end part flange 202 to the position of the end tubular part 200a of the vessel main body 200, and the seal member 300' held by the part 210 to be fitted is pressed to 'b−c' by the end tubular part 200a of the vessel main body 200. Therefore, under a state that the inner edge sealing butting piece 302'having the dimension of a1 in the state before the attachment is elastically deformed to 'b−c', the inner edge sealing butting piece 302' is arranged to come into contact with the bottom wall 213 of the part 210 to be fitted.

As compared therewith, since the protruding piece 303' of the seal member 300' satisfies the relation of a2≦b−c, the protruding piece 303' is arranged so as not to come into contact with the bottom wall 213 of the part 210 to be fitted, or to come close to the bottom wall 213 in such a manner as to come into contact therewith, however, is not elastically deformed.

Accordingly, it cannot be said that the protruding piece 303' is arranged to elastically come into contact with the bottom wall 213 of the part 210 to be fitted. Thus, a sealing part is not obtained in the part of the protruding piece 303' and a sliding resistance due to a contact cannot be obtained 30 between the protruding piece 303' and the bottom wall 213 of the part 210 to be fitted.

The peripheral edge sealing butting piece 304' is arranged to elastically come into contact with the peripheral wall 214 of the part 210 to be fitted.

As described above, in this comparative embodiment, since the protruding piece 303' does not serve like the sealing butting piece 303 of the first embodiment, when a user erroneously rotates the attached end part flange 202, the sliding resistance by the sealing butting pieces 302' and 304' act, however, the sliding resistance by the protruding piece 303' is not obtained. Therefore, as compared with the first embodiment, there is more fear that the end part flange 202 is erroneously rotated and the end part flange 202 is erroneously opened.

(Positioning State by Positioning Mechanism)

Figure 20A:
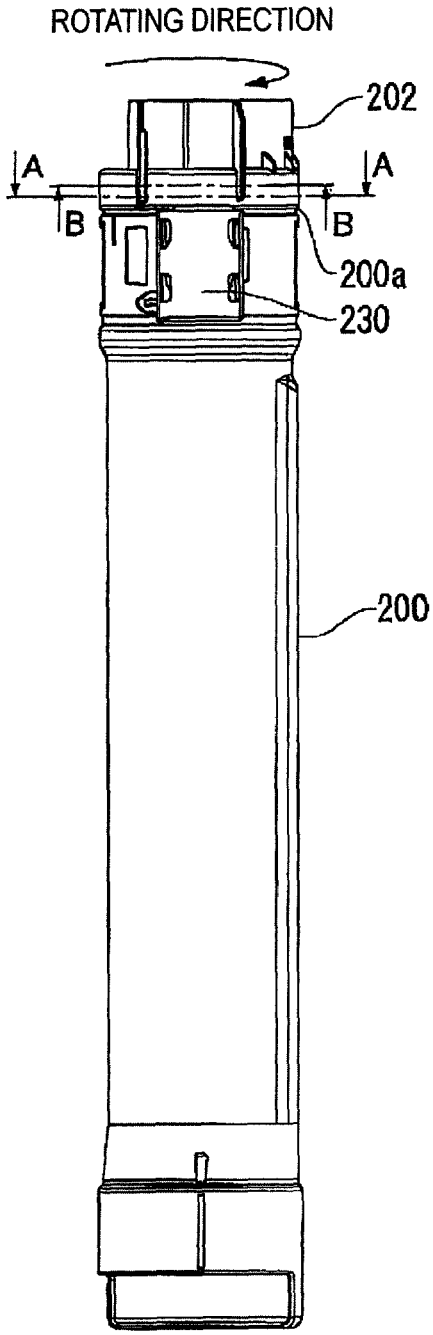
FIG. 20A is an explanatory view showing a state that the cover member begins to be attached in the developer accommodating vessel used in this embodiment.
Figure 20B:
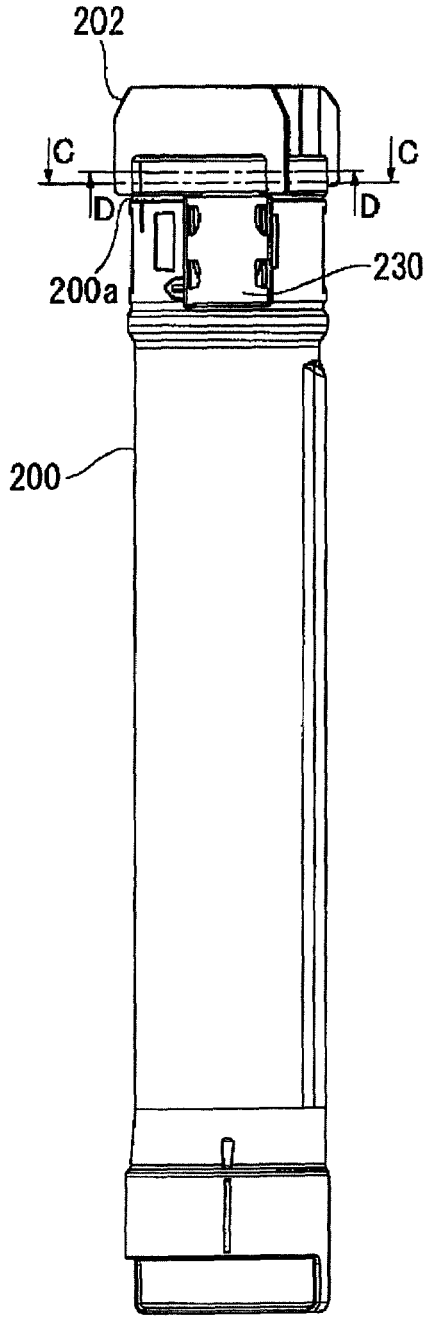
FIG. 20B is an explanatory view showing the attached state of the cover member of the developer accommodating vessel used in this embodiment.

In this embodiment, when the end part flange 202 is attached to the vessel main body 200, as shown in FIG. 20A, the part 210 to be fitted of the end part flange 202 may be pushed in to the end tubular part 200a of the vessel main body 200, and then, the end part flange 202 may be rotated in a prescribed direction. When the end part flange 202 is rotated by a prescribed amount, as shown in FIG. 20B, the end part flange 202 is positioned to the end tubular part 200a of the vessel main body 200 by the positioning mechanism 400 under a state that the end part flange 202 is prevented from slipping out and rotating, so that the end part flange 202 is attached to the end tubular part 200a of the vessel main body 200.

Figure 21:
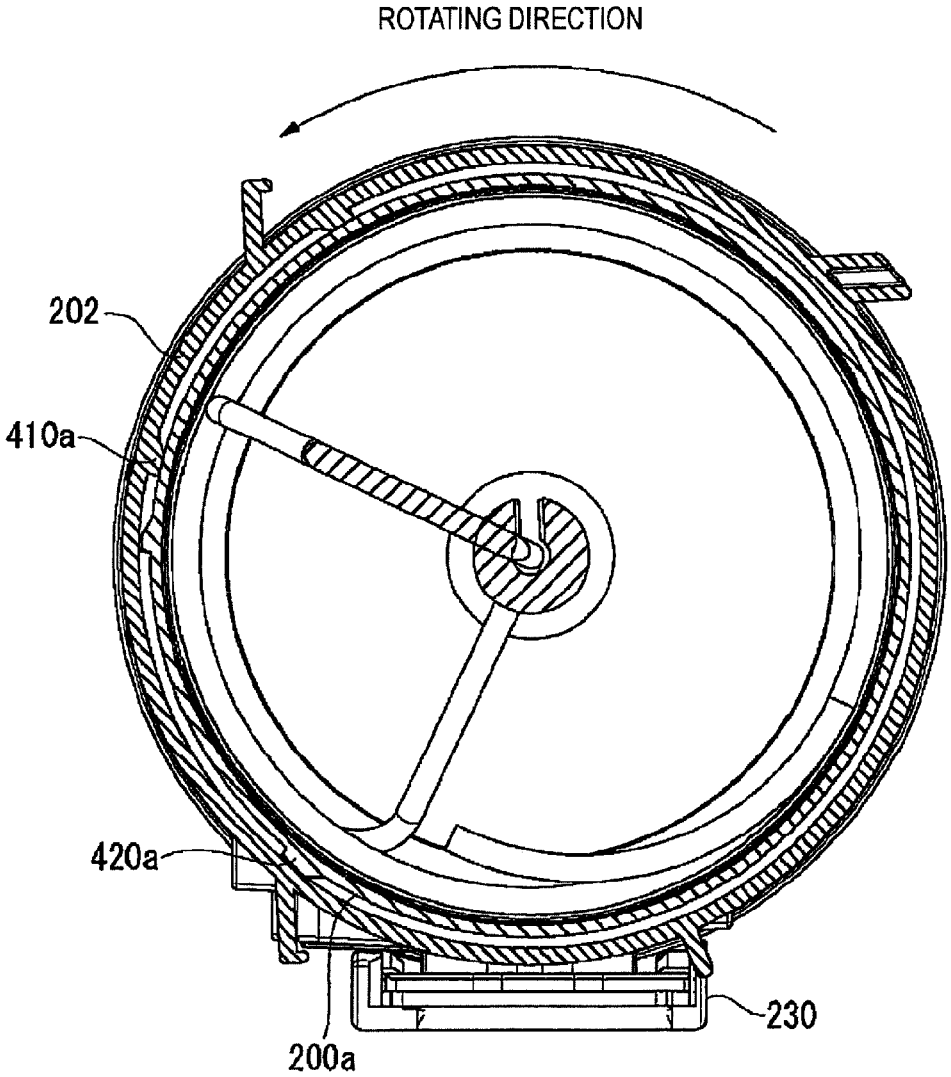
FIG. 21 is an explanatory view of a section taken along a line A-A in FIG. 20A.
Figure 23:
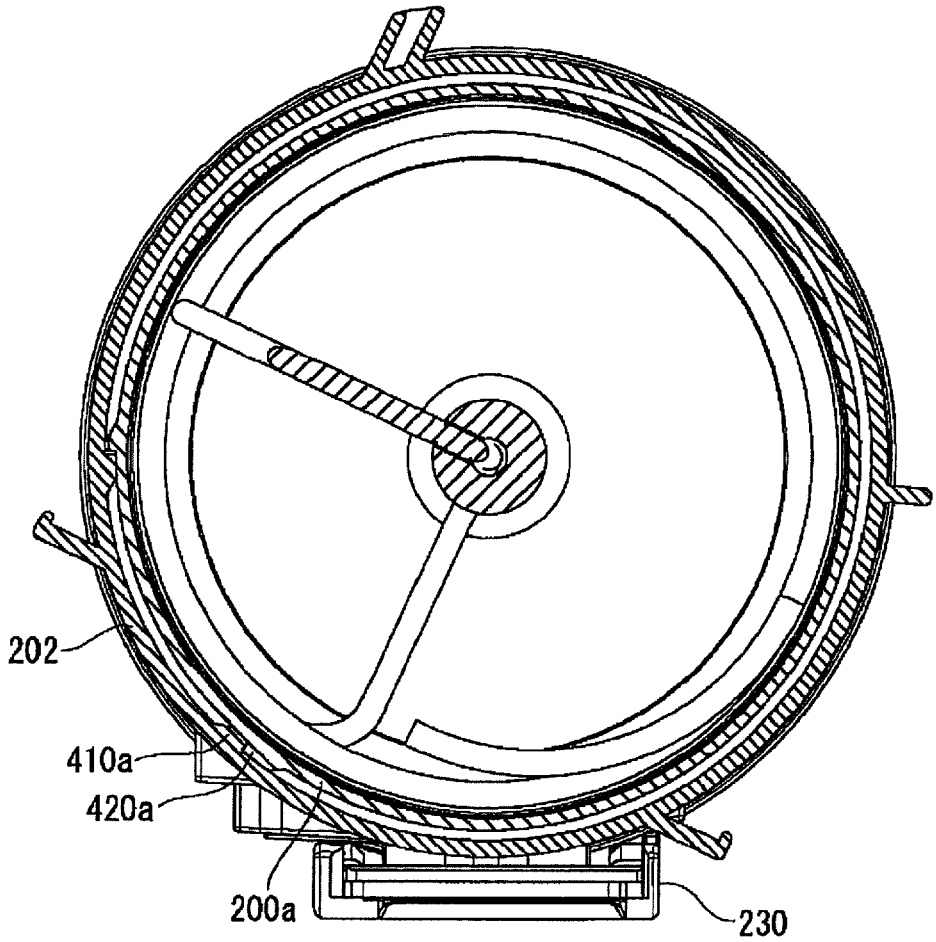
FIG. 23 is an explanatory view of a section taken along a line C-C in FIG. 20B.

Specifically, a first positioning element (the first protrusion 410a to be positioned+the first positioning protrusion 420a) moves from a state shown in FIG. 21 to a state shown in FIG. 23 to position the first protrusion 410a to be positioned to the first positioning protrusion 420a.

Figure 22:
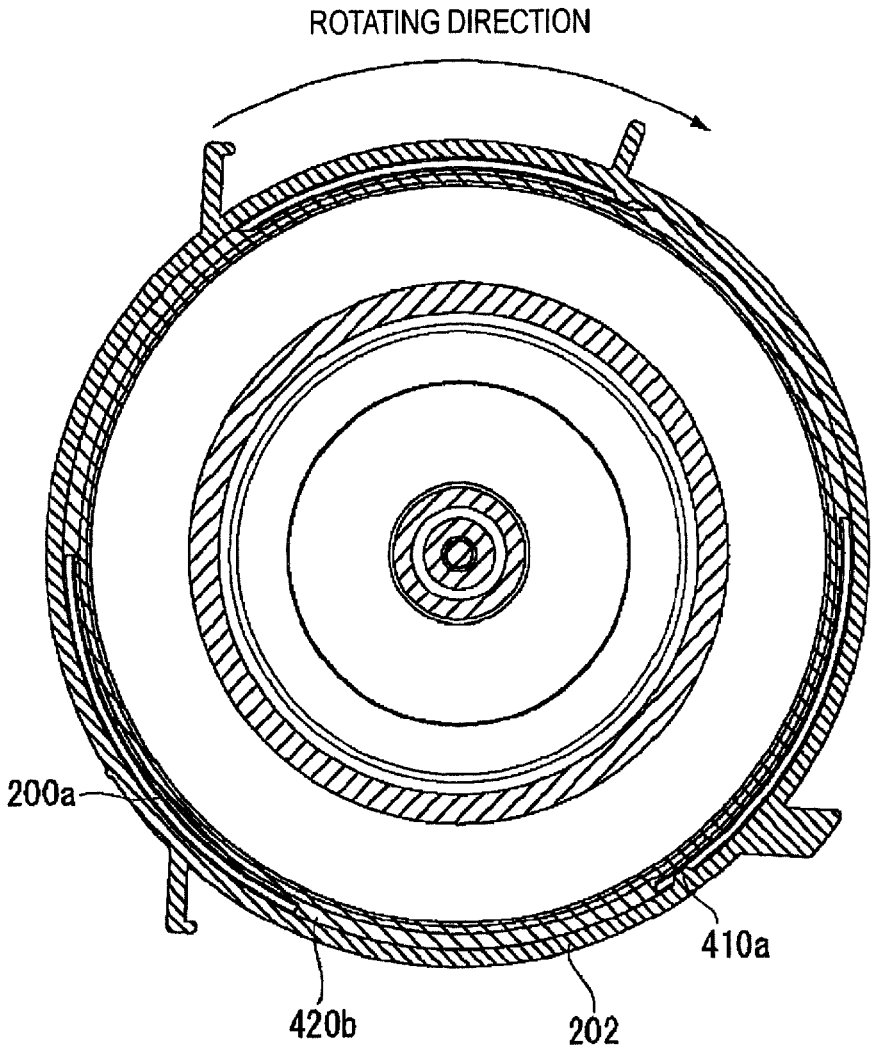
FIG. 22 is an explanatory view of a section taken along a line B-B in FIG. 20A.
Figure 24:
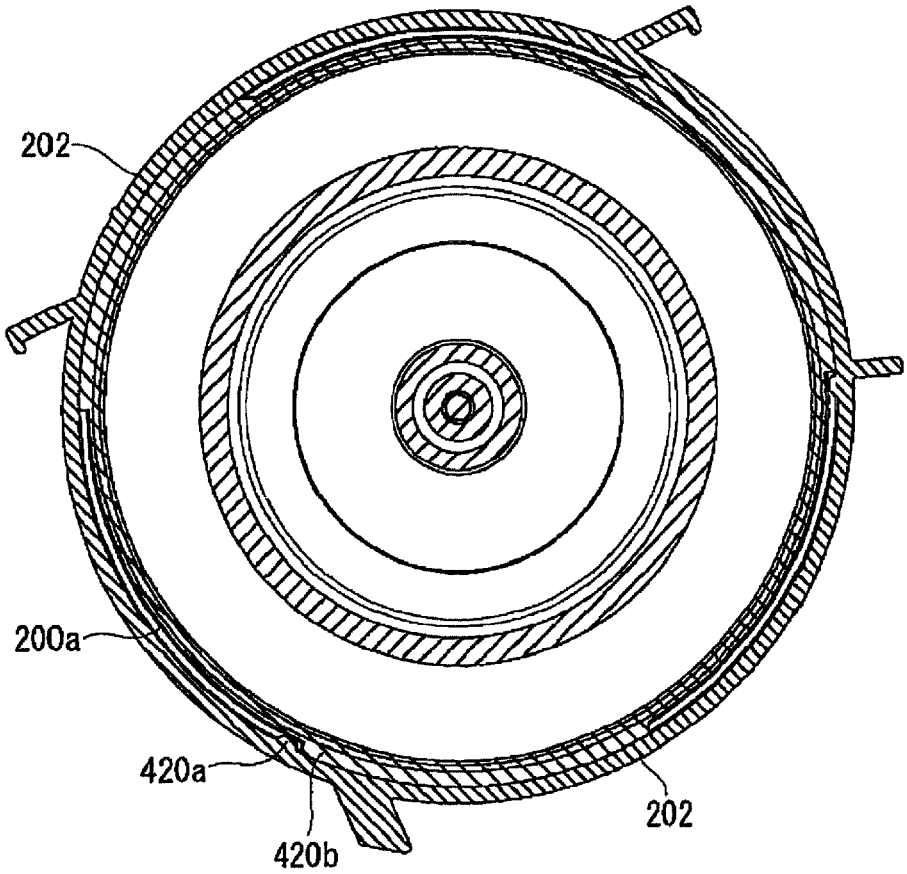
FIG. 24 is an explanatory view of a section taken along a line D-D in FIG. 20B.

On the other hand, a second positioning element (the second protrusion 410b to be positioned+the second positioning protrusion 420b) moves from a state shown in FIG. 22 to a state shown in FIG. 24 to position the second protrusion 410b to be positioned to the second positioning protrusion 420b.

(Positioning Operation by First Positioning Element (FIG. 25, FIG. 26))

Figure 25:
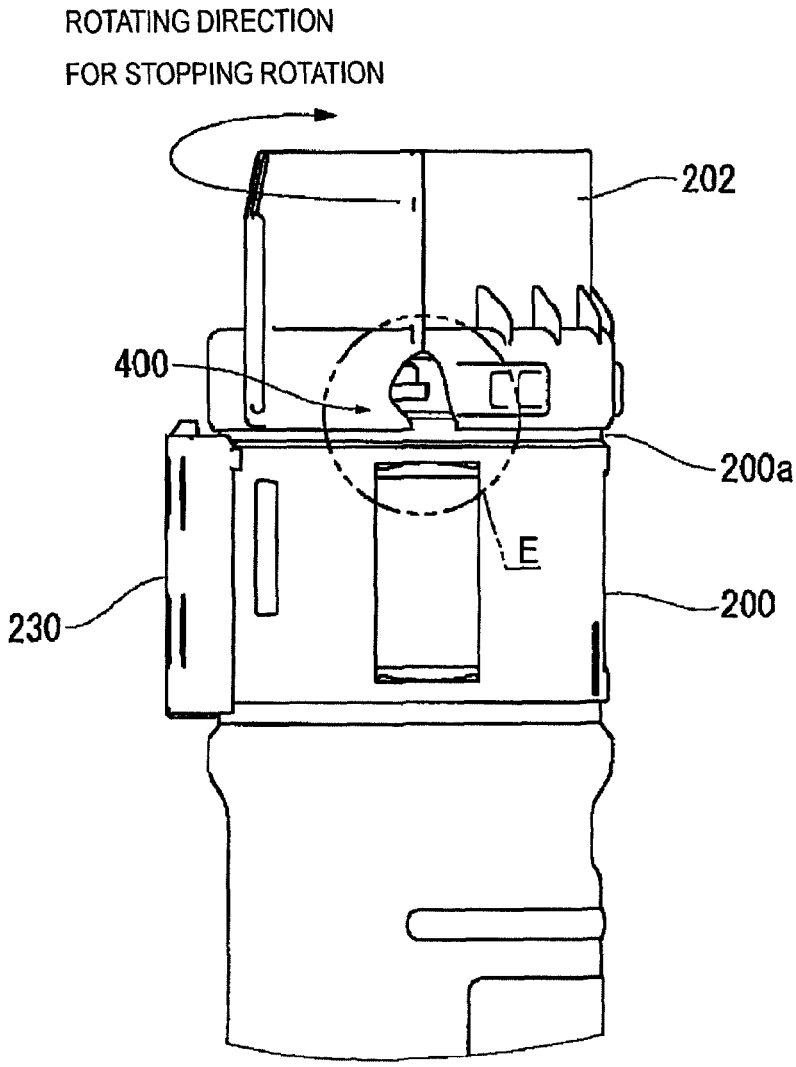
FIG. 25 is an explanatory view showing a positioning state by a first positioning element of the positioning mechanism used in this embodiment.

In the first positioning element, as shown in FIG. 25, the first protrusion 410a to be positioned (see FIG. 16) is positioned by the first positioning protrusion 420a (see FIG. 18).

Figure 26A:
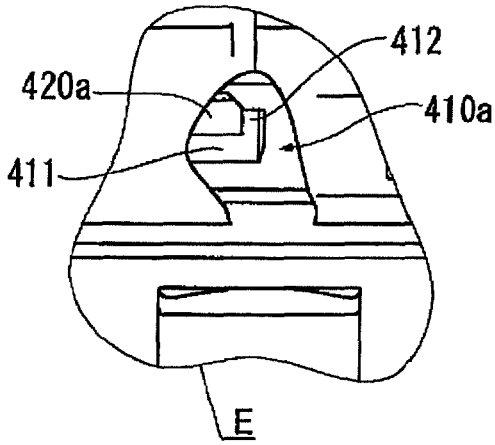
FIG. 26A is a detailed view of a part E in FIG. 25.

At this time, as shown in FIG. 25 and FIG. 26A, the guide protrusion 411 of the first protrusion 410a to be positioned abuts on the stop wall 422 of the positioning protrusion 421 of the first positioning protrusion 420a to be stopped. Further, the rotation stop protrusion 412 of the first protrusion 410a to be positioned abuts on the end part of the positioning protrusion 421 to be stopped.

Under this state, as shown in FIG. 25, when the attached end part flange 202 tries to be rotated in a rotating direction for stopping the rotation shown by an arrow mark, as shown in FIG. 25 and FIG. 26A, the rotation stop protrusion 412 of the first protrusion 410a to be positioned is stopped by the stop wall 422 at the end part of the positioning protrusion 421 of the first positioning protrusion 420a. Further, the guide surface 415 of the guide protrusion 411 of the first protrusion 410a to be positioned is stopped by the guide surface 423 formed in the stop wall 422 of the positioning protrusion 421 of the first positioning protrusion 420a.

Figure 26B:
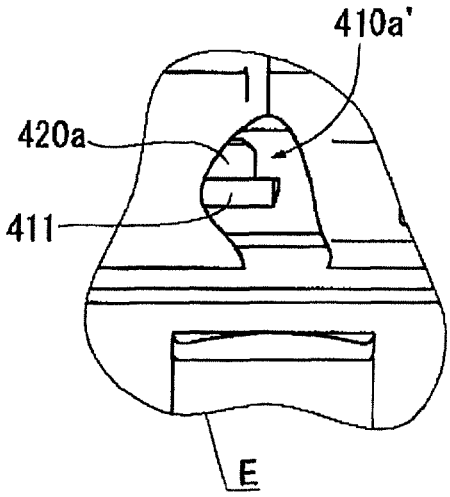
FIG. 26B is an explanatory view showing a comparative example of the first positioning element.

At this time, as compared with a comparative example 410a' shown in FIG. 26B (a form in which the rotation stop protrusion 412 is removed from the first protrusion 410a to be positioned), a preventing force for stopping the rotation can be received by the rotation stop protrusion 412 when the end flange part 202 is rotated. In this case, when the contact area of the rotation stop protrusion 412 and the end part of the positioning protrusion 421 of the first positioning protrusion 420a is ensured to be wider, the preventing force for stopping the rotation at the time of rotating the end part flange 202 is the more increased.

Especially, in this embodiment, since the preventing force for stopping the rotation at the time of rotating the end part flange 202 can be also received by the guide surface 415 of the guide protrusion 411 of the first protrusion 410a to be positioned, the preventing force for stopping the rotation of the end part flange 202 is more preferably increased.

(Positioning Operation by Second Positioning Element (FIG. 27, FIG. 28))

Figure 27:
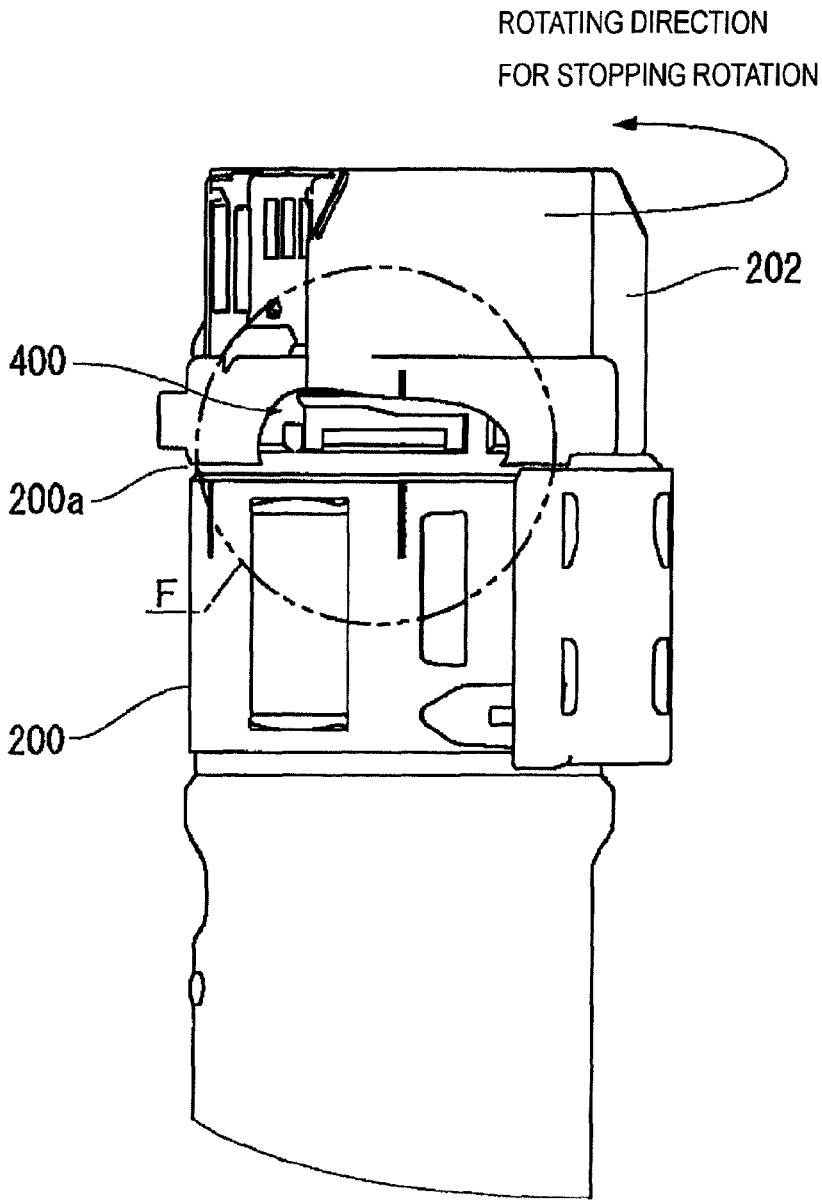
FIG. 27 is an explanatory view showing a positioning state by a second positioning element of the positioning mechanism used in this embodiment.

In the second positioning element, as shown in FIG. 27, the second protrusion 410b to be positioned (see FIG. 17) is positioned by the second positioning protrusion 420b (see FIG. 19).

Figure 28A:
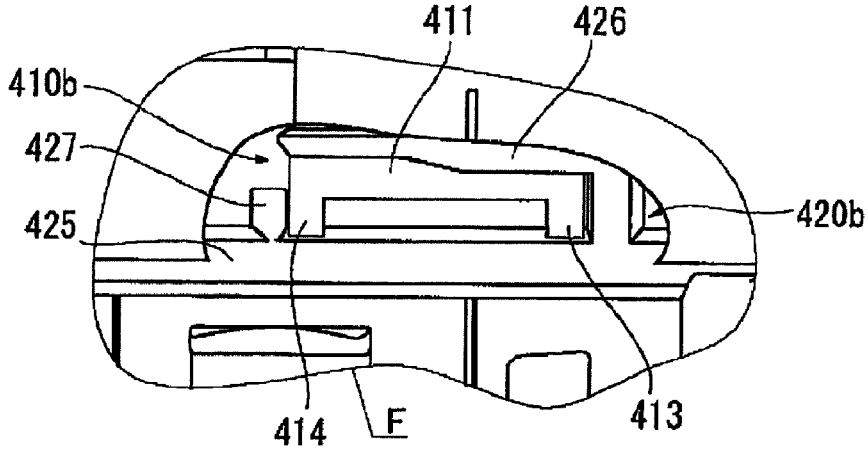
FIG. 28A is a detailed view of a part F in FIG. 27.

At this time, as shown in FIGS. 27 and 28A, the second protrusion 410b to be positioned is accommodated in the partition area 428 of the second positioning protrusion 420b.

Under this state, the guide protrusion 411 of the second protrusion 410b to be positioned is stopped by the stop wall 422 of the positioning partition wall 426 of the second positioning protrusion 420b. Further, the rotation stop protrusion 413 of the second protrusion 410b to be positioned abuts on the stop wall 422 at the end part of the positioning partition wall 426 to be stopped.

Under this state, as shown in FIG. 27, when the attached end part flange 202 tries to be rotated in a rotating direction for stopping the rotation shown by an arrow mark, as shown in FIGS. 27 and 28A, the rotation stop protrusion 413 of the second protrusion 410b to be positioned is stopped by the stop wall 422 at the end part of the positioning partition wall 426 of the second positioning protrusion 420b. Further, the guide surface 415 of the guide protrusion 411 of the second protrusion 410b to be positioned is stopped by the guide surface 423 formed on the stop wall 422 of the positioning partition wall 426 of the second positioning protrusion 420b.

Figure 28B:
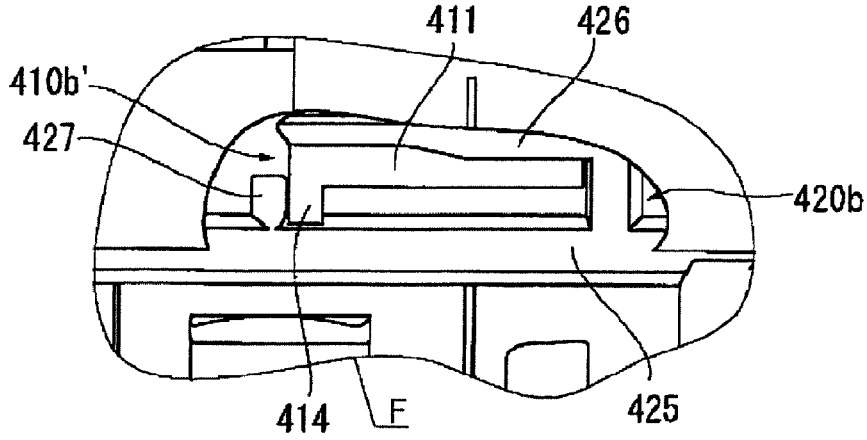
FIG. 28B is an explanatory view showing a comparative example of the second positioning element.

At this time, as compared with a comparative example 410b' shown in FIG. 28B (a form in which the rotation stop protrusion 413 is removed from the second protrusion 410b to be positioned), a preventing force for stopping the rotation can be received by the rotation stop protrusion 413 when the end flange part 202 is rotated. In this case, since the contact area of the rotation stop protrusion 413 and the stop wall 422 of the positioning partition wall 426 of the second positioning protrusion 420b is ensured to be wider than that of the comparative example, the preventing force for stopping the rotation at the time of rotating the end part flange 202 is increased more than that of the comparative example.

Especially, in this embodiment, since the preventing force for stopping the rotation at the time of rotating the end part flange 202 can be also received by the guide surface 415 of the guide protrusion 411 of the second protrusion 410b to be positioned, the rotating torque resistance of the end part flange 202 is preferably more distributed.

Further, in this embodiment, since the second protrusion 410b to be positioned includes the butting protrusion 414 abutting on the stepped annular part 425 separately from the rotation stop protrusion 413, the second protrusion 410b to be positioned does not collapse nor move in the partition area 248 of the second positioning protrusion 420b. Thus, an attached state of the end part flange 202 is not deteriorated.

Further, according to this embodiment, since, in the partition area 428 of the second positioning protrusion 420b, the partition area width j located in an opposite side to the partition area width m is ensured to be wider than the partition area width m located in the rotating direction side at the time of attaching the end part flange 202, the second protrusion 410b to be positioned preferably easily enters the partition area 428 and moves to the narrow area of the partition area 428 to be readily positioned.

(Positioning Operation by First and Second Positioning Mechanisms)

Further, in this embodiment, the first protrusion 410a to be positioned and the second protrusion 410b to be positioned respectively have the rotation stop protrusions 412 and 413 extending in the opposite directions to each other relative to the pushing and pulling direction of the end part flange 202. Thus, under the state that the end part flange 202 is attached to the vessel main body 200, when the end part flange 202 tries to be rotated to a prescribed rotating direction to detach the end part flange 202 from the vessel main body 200, for instance, the rotation stop protrusion 412 of the one protrusion 410 (for instance 410a) to be positioned is directly stopped by the stop wall 422 of for instance, the one positioning protrusion 420 (for instance 420a). Further, when the end part flange 202 tries to be rotated to the prescribed rotating direction, the end flange part 202 is inclined relative to the vessel main body 200 on the above-described rotation stop part as a supporting point. Under a state that the end part flange 202 is inclined, the rotation stop protrusion 413 of the other protrusion 410 (for instance, 410b) to be positioned is stopped by the stop wall 422 of the other positioning protrusion 420 (for instance, 420b).

When the end part flange 202 tries to be rotated in an opposite rotating direction relative to the vessel main body 200, the other rotation stop protrusion 413 is directly stopped by the stop wall 422 of the other positioning protrusion 420 (420b). Under a state that the end part flange 202 is inclined relative to the vessel main body 200 on the above-described rotation stop part as a supporting point, the one rotation stop protrusion 412 is stopped by the stop wall 422 of the one positioning protrusion 420 (420a).

Accordingly, the sliding resistance due to the contact between the positioning protrusion 420 (420a, 420b) and the protrusion 410 (410a, 410b) to be positioned is increased, so that the end part flange 202 is hardly slipped off and rotated relative to the vessel main body 200.

Further, in the movement of the end part flange 202 in a pulling out direction, the guide protrusion 411 of the first protrusion 410a to be positioned is stopped by the positioning protrusion 421 of the first positioning protrusion 420a. Further, the guide protrusion 411 of the second protrusion 410b to be positioned is stopped by the positioning partition wall 426 of the second positioning protrusion 420b. Thus, the movement of the end part flange 202 to the pulling out direction is prevented.

(Shutter)

Further, in this embodiment, on a peripheral wall of the vessel main body 200 located near the end part flange 202, a discharging opening 220 is opened. In the discharging opening 220, a shutter 230 is provided as an opening and closing mechanism that opens and closes the opening 220.

Figure 29:
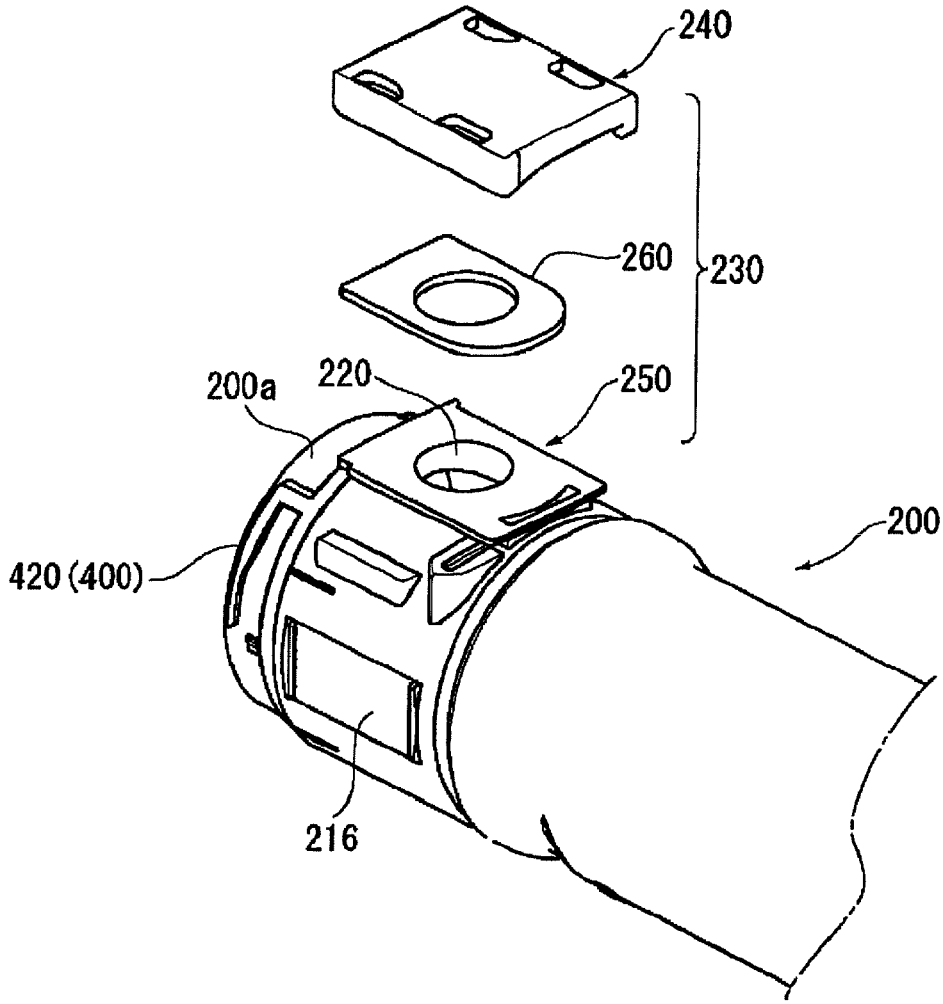
FIG. 29 is an exploded perspective view showing a shutter (a closing cover, a cover holding frame) used in the first embodiment.
Figure 30A:
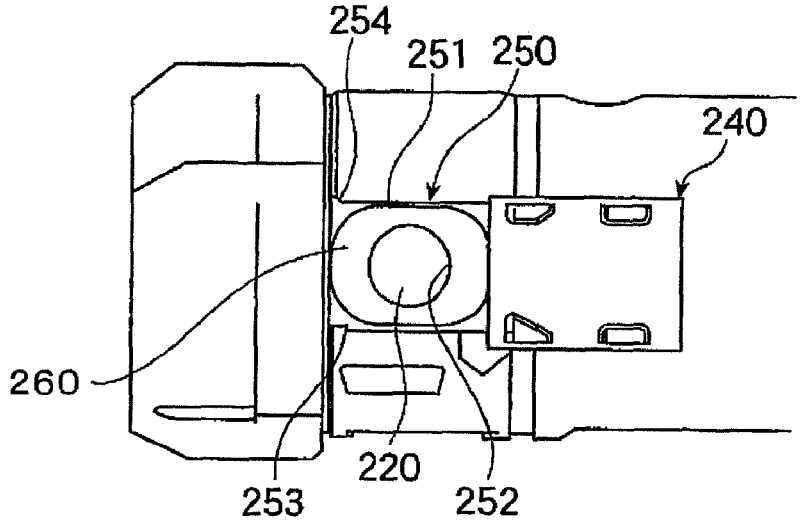
FIG. 30A is a paln explanatory view of the shutter used in the first embodiment.

In this embodiment, the shutter 230 includes, as shown in FIGS. 29 and 30A, a closing cover 240 for closing the discharging opening 220 and a cover holding frame 250 that holds the closing cover 240 so as to freely move along an opening and closing direction.

(Closing Cover)

Figure 30B:
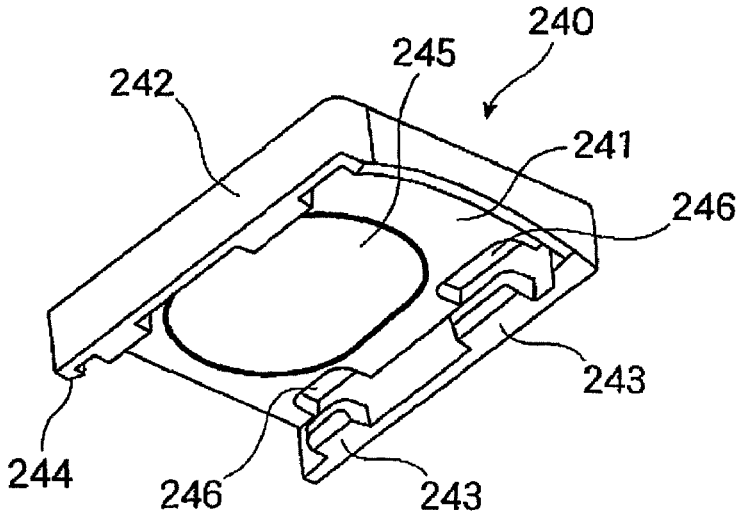
FIG. 30B is a perspective explanatory view showing the detail of the closing cover.

Here, the closing cover 240 includes, as shown in FIG. 30B, a flat plate shaped cover main body 241 having a substantially rectangular form that has at least a larger area than that of the discharging opening 220. Side wall parts 242 are formed correspondingly to three sides except one direction in the opening and closing direction of the cover main body 241. In the side wall parts 242 located at both sides in the direction of width orthogonal to the opening and closing direction, the suitable number (in this example, two arms spaced in the opening and closing direction respectively in one side) of holding arms 243 are formed that protrude inward and embrace and hold the cover holding frame 250. Further, in an opened end of the side wall part 242 located in one side in the direction of width of the cover main body 241, a hook pawl 244 as a stopper part is formed. On the surface of the cover main body 241 in the cover holding frame 250 side, an elastic seal material 245 is stuck that elastically comes into contact with the cover holding frame 250.

In this example, in the parts of the cover main body 241 corresponding to the holding arms 243, hole parts 246 are provided. The closing cover 240 holds both the side edges of the cover holding frame 250 by three points including the two holding arms 243 and the cover main body 241 located between the holding arms 243 and moves along both the side edges of the cover holding frame 250 in a stable way.

(Cover Holding Frame)

In this embodiment, the cover holding frame 250 includes, as shown in FIG. 30A, a flat plate shaped frame main body 251 having a substantially rectangular form. On a part of the frame main body 251 corresponding to the discharging opening 220, a through hole 252 is opened. Further, in one corner part of an end edge of the frame main body 251 in the closing direction of the closing cover 240, a cut-out stop part 253 is formed. In an opposite corner part of the end edge of the frame main body 251, a position regulating protrusion 254 is formed that protrudes in the direction of width orthogonal to the opening and closing direction.

Figure 31:
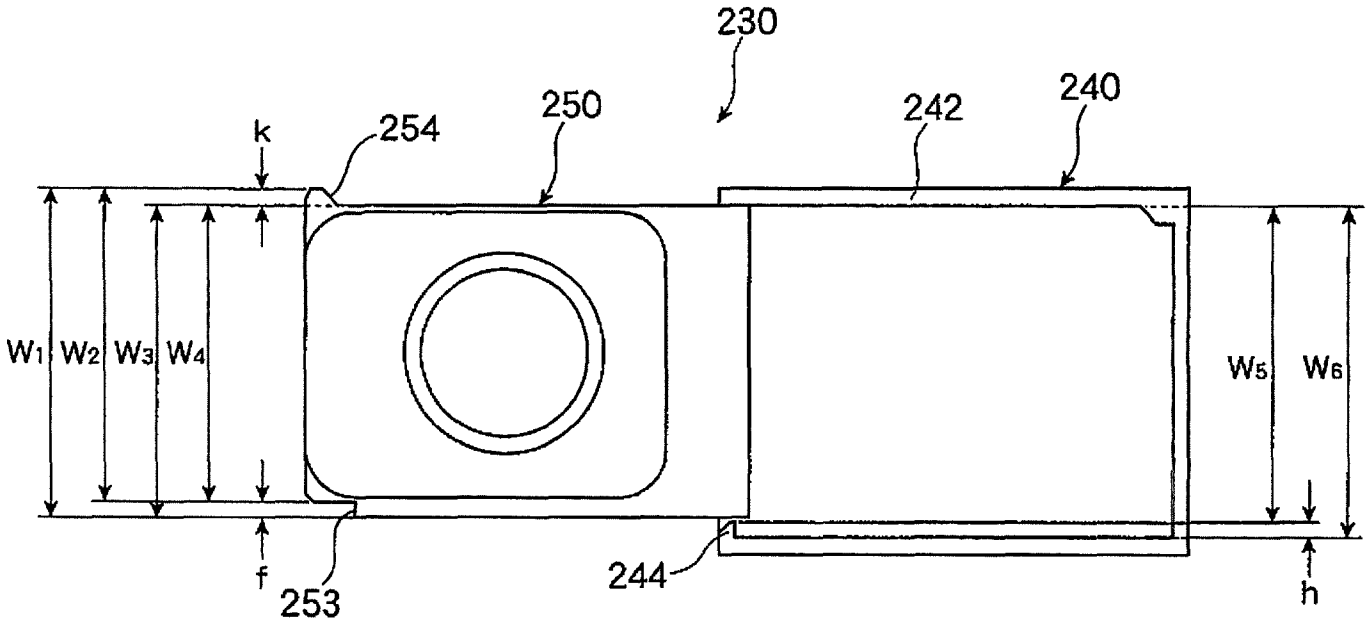
FIG. 31 is an explanatory view showing the detail of a dimensional relation for opening and closing the shutter (the closing cover, the cover holding frame) used in the first embodiment.

Especially, in this embodiment, as shown in FIG. 31, a dimension between both side edges in the direction of width of the cover holding frame 250 is set to be slightly narrower than a dimension between both the side wall parts 242 in the direction of width of the closing cover 240.

Further, in this embodiment, as shown in FIG. 31, a protruding dimension k of the position regulating protrusion 254 from reference positions of both the side edges in the direction of width of the cover holding frame 250 is set to be larger than the dimension of the stop part 253 in the direction of width. When the side wall part of the closing cover 240 in the direction of width abut on the reference position of the side edge in the direction of width of the cover holding frame 250, since the closing cover 240 moves by the protruding dimension k of the position regulating protrusion 254 in the direction of width, the hook pawl 244 of the closing cover 244 is disengaged from the stop part 253 to maintain a positional relation for unlocking.

In FIG. 29, reference numeral 260 designates a seal plate made of, for instance, an elastic rubber that is provided between the closing cover 240 and the cover holding frame 250 to seal a part between them, and is for instance, fixed to the frame main body 251.

Here, a dimensional relations for opening and closing the shutter 230 (the closing cover 240, the cover holding frame 250) is summarized as shown in FIG. 31.

In FIG. 31, w1 to w6 and f, h and k designate below-described dimensions.

w1: dimension of maximum width to an end of the position regulating protrusion of the cover holding frame w2: dimension of width from the end of the position regulating protrusion to the stop part of the cover holding frame w3: dimension of width between both side parts of the cover holding frame excluding the position regulating protrusion w4: dimension of width from one side part excluding the position regulating protrusion to the stop part of the cover holding frame w5: dimension of width from an inner surface of one side wall in the direction of width to the stopper part of the closing cover w6: dimension of maximum width between both side walls in the direction of width of the closing cover excluding the stopper part f: stop length of the stop part h: hook length of stopper part (hook pawl)

k: protruding dimension of the position regulating protrusion

In FIG. 31, when conditions under which the closing cover 240 is fitted to the cover holding frame 250 are initially examined, if w2>w5 and w3>w5, the closing cover 240 is not fitted to the cover holding frame 250, it is necessary to obtain the conditions of w5−w2>0 and w5−w3>0 are necessary.

Then, if w1<w5, even when the closing cover 240 moves along the end position of the position regulating protrusion 254, the hook pawl 244 as the stopper part 253 is not overlapped on the stop part 253 in the opening and closing direction. Thus, there is a fear that the hook pawl 244 and the stop part 253 do not function as a movement restraining unit. Thus, the condition of w1−w5>0 is necessary.

Now, the stop length f(w1−w2) of the stop part 253 is examined. f needs to be larger than a space of w5−w2, that is, the condition of f−(w5−w2)>0 or f>w5−w2 is necessary.

Similarly, when the protruding dimension k(w1−w3) of the position regulating protrusion 254 is investigated, k needs to be larger than a space of w5−w3, that is, the condition of k−(w5−w3)>0 or k>w5−w3 is necessary.

Further, when the hook length h (w6−w5) of the hook pawl 244 as the stopper part is short, a result of w1>w6 is obtained so that the closing cover 240 is not fitted to the cover holding frame 250. Accordingly, the condition of w6−w1>0 is necessary.

At this time, h needs to be larger than a space of w6−w1, that is, the condition of h−(w6−w1)>0 or h>w6−w1 is necessary.

(Operating Processes of Shutter)

In this embodiment, the shutter 230 operates over operating processes as shown in FIGS. 32 and 33.

(1) Shutter close

This shows a state that the closing cover 240 is located at a closing position for completely closing the discharging opening 220.

Figure 32B:
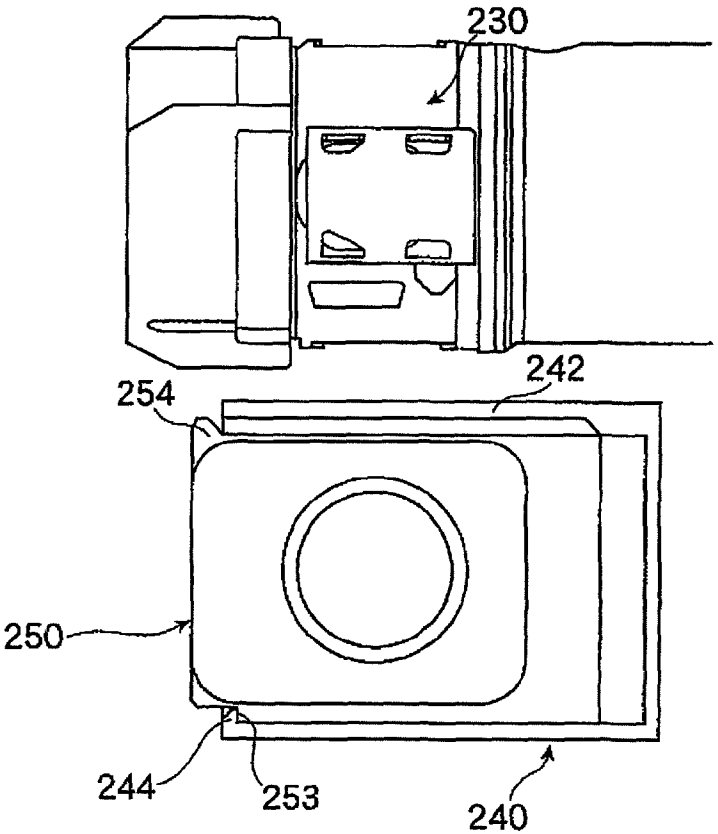
FIG. 32B is an explanatory view showing an operating process of the shutter in a locked state.
Figure 32A:
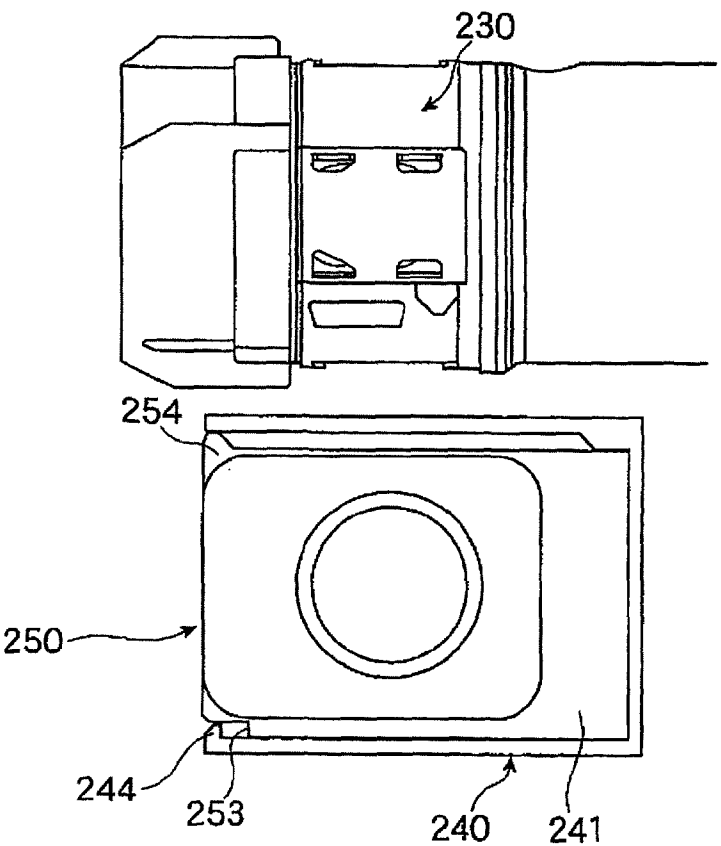
FIG. 32A is an explanatory view showing an operating process of the shutter located in a closing position.

At this time, as shown in FIG. 32A, the side wall part 242 located in the opening and closing direction of the closing cover 240 abuts on one end part in the opening and closing direction of the cover holding frame 250. The side wall part 242 in the direction of width of the closing cover 240 is located at a position abutting on the end of the position regulating protrusion 254 of the cover holding frame 250.

(2) Shutter Lock

When the closing cover 240 moves from the state shown in FIG. 32A to an opening direction, the closing cover 240 moves by maintaining a state that a position is regulated by the position regulating protrusion 254 and the hook pawl 244 of the closing cover 240 abuts on the stop part 253 (see FIG. 32B).

At this time, since the closing cover 240 is restrained from moving at a position before an opening operation is started, the shutter 230 is locked relative to the opening and closing direction.

Therefore, for instance, even when the developer accommodating vessel 38 is erroneously dropped at the time of attaching the developer accommodating vessel, or a cushioning material such as foaming styrene is not put in both sides of a box shaped corrugated paper board at the time of transportation, there is substantially no fear that the shutter 230 is erroneously opened.

(3) Shutter Unlock

As described in (2), under a state that the shutter is locked, the side wall part 242 in the direction of width of the closing cover 240 moves to a position passing the position regulating protrusion 254 of the cover holding frame 250. Thus, the closing cover 240 is permitted to move to come close to the side edge in the direction of width of the cover holding frame 250 relative to the direction of width (an intersecting direction) orthogonal to the opening and closing direction.

Here, the closing cover 240 moves along the direction of width until the one side wall part 242 in the direction of width abuts on the reference position of the side edge in the direction of width of the cover holding frame 250.

Figure 33B:
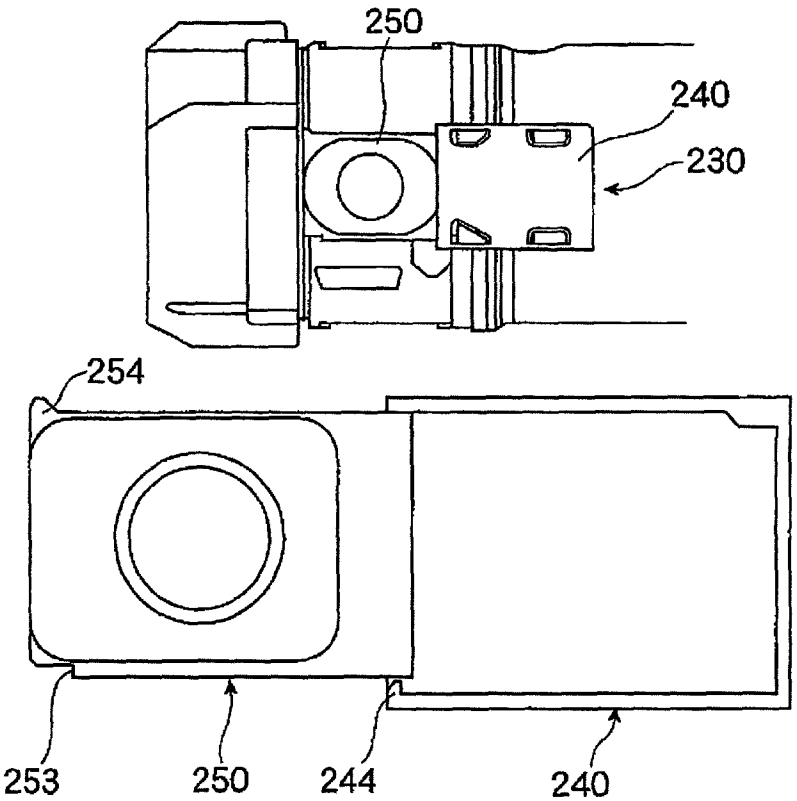
FIG. 33B is an explanatory view showing an operating process of the shutter located in an opening state.
Figure 33A:
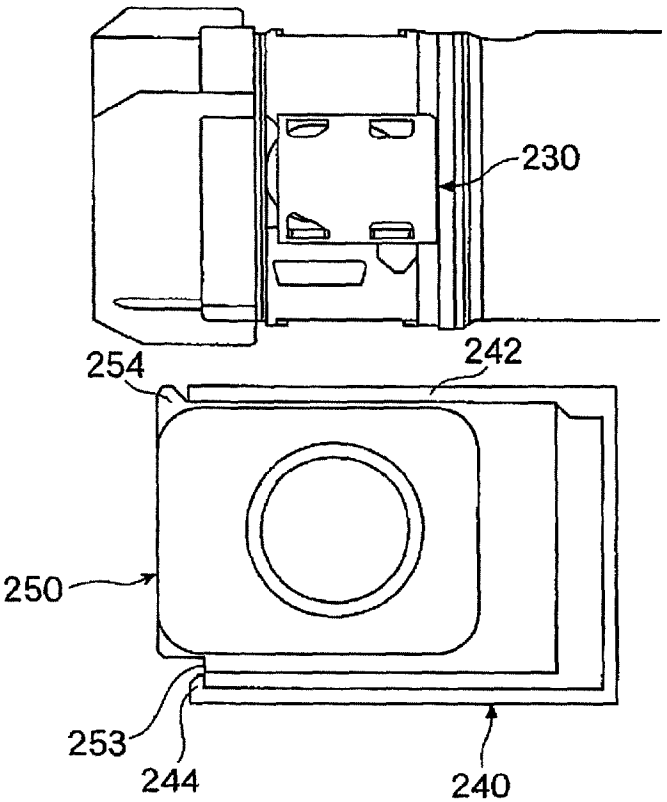
FIG. 33A is an explanatory view showing an operating process of the shutter in an unlocked state.

At this time, as shown in FIG. 33A, since the hook pawl 244 of the closing cover 240 moves to a position where the hook pawl 244 does not come into contact with the stop part 253 of the cover holding frame 250, the hook pawl 244 can move in the opening and closing direction of the closing cover 240 to release the restrained state of the closing cover 240 by the stop part 253 and the hook pawl 244. That is, the locked state of the shutter 230 relative to the opening and closing direction is unlocked, so that the shutter can move in the opening and closing direction.

(4) Shutter Open

As described in (3), when the shutter 230 is unlocked, since the closing cover 240 is permitted to move in the opening and closing direction, the closing cover 240 moves to an opening position to completely open the discharging opening 220.

At this time, the hook pawl 244 of the closing cover 240 moves along the side edge in the direction of width of the cover holding frame 250 under a non-contact state as shown in FIG. 33B, the opening operation of the closing cover 240 is not prevented, so that the closing cover 240 moves to its terminal end position (opening position).

Under this state, in this embodiment, since an urging force such as a spring does not need to act on a part between the closing cover 240 and the cover holding frame 250, the closing cover 240 moves to the opening and closing direction without a specially strong operating force.

Second Embodiment

Figure 15:
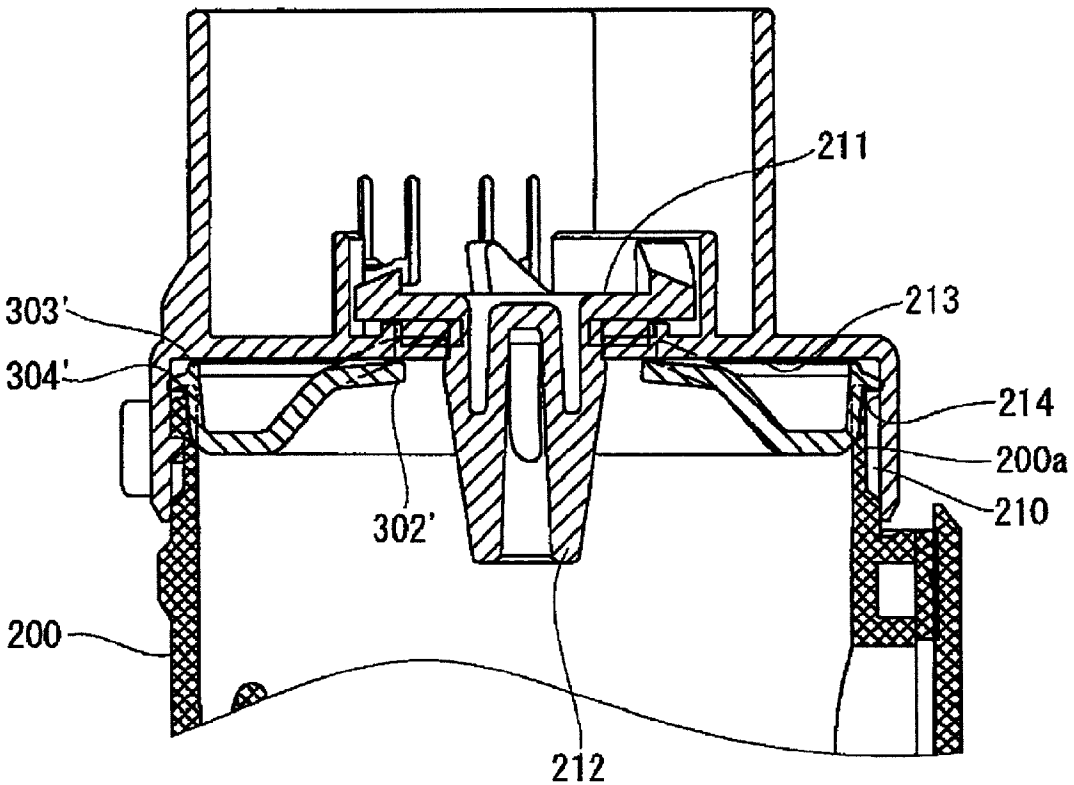
FIG. 15 is an explanatory view showing the operation of the seal member in an attached state that the cover member is attached to a vessel main body in the developer accommodating vessel according to the comparative embodiment.

An image forming device according to this embodiment uses a developer accommodating vessel substantially the same as the developer accommodating vessel 38 used in the first embodiment, however, uses, differently from the first embodiment, the seal member 300' according to the comparative embodiment shown in FIGS. 14 and 15 in place of the seal member 300 used in the first embodiment, and employs a positioning mechanism 400 having the same structure as that of the first embodiment.

In this embodiment, as shown in FIG. 6, when an end part flange 202 is attached to an end tubular part 200a of a vessel main body 200, even if a user erroneously rotates the attached end part flange 202, the positioning characteristics of the end part flange 202 are assuredly maintained by the positioning mechanism 400. Accordingly, though a sufficient sliding resistance by the sealing butting pieces 302 to 304 of the seal member 300 obtained in the first embodiment cannot be obtained, the end part flange 202 is not erroneously rotated and there is no fear that the end part flange 202 is erroneously opened.

In this embodiment, a form is shown that uses the seal member 300' according to the comparative embodiment, however, the present invention is not limited thereto. It is to be understood that a seal member such as a seal plate of felt or rubber may be used between the end part flange 202 and the end tubular part 200a of the vessel main body 200 or another sealing structure may be used without using such a seal member.

Further, in the above-described embodiment, the developer accommodating vessel (the toner cartridge) is exemplified and explained that is detachably attached to the image forming device of the electro-photographic system and accommodates the developer composed of powder type toner used in the developing device, however, the present invention may be applied to all accommodating vessels for accommodating an image forming material supplied to the image forming device. For instance, when a sealing property in a periphery of a shutter is improved, the present invention may be applied to the developer accommodating vessel for accommodating liquid developer. Further, the present invention may be applied to an ink accommodating vessel for accommodating ink supplied to an ink jet type image forming device.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An accommodating vessel, which is detachably attached to a vessel receiving part of a casing of an image forming device to accommodate an image forming material, the accommodating vessel comprising:

a vessel main body that includes a tubular part with one opening opened in one end and in which the image forming material is accommodated;

a cover member that includes a fitted part to which the tubular part of the vessel main body is detachably fitted, and that is pushed in to the tubular part so as to freely rotate to an attaching position;

at least one positioned protrusion that is provided to protrude in the fitted part of the cover member, and that is used to position the cover member to a positioning place of the tubular part of the vessel main body; and at least one positioned positioning protrusion that is provided to protrude in the tubular part of the vessel main body, and that abuts on the at least one positioned protrusion to position the at least one positioned protrusion to a positioning place, wherein the at least one positioned protrusion includes:

a guide protrusion that extends in a rotating direction of the cover member; and a plurality of rotation stop protrusions that extends in opposite directions to each other relative to the guide protrusion along a pushing and pulling direction of the cover member, and wherein the positioning protrusion includes a stop wall that abuts on the guide protrusion and the plurality of rotation stop protrusions of the at least one positioned protrusion to be stopped.

2. The accommodating vessel as claimed in claim 1, wherein the at least one positioned protrusion comprises a plurality of positioned protrusions, and the at least one positioning protrusion comprises a plurality of positioning protrusions.

3. The accommodating vessel as claimed in claim 2, wherein any of the positioned protrusions comprises:

the guide protrusion; and the rotation stop protrusion, and at least one of the positioned protrusions includes at least a rotation stop protrusion that extends in a direction opposite to an extending direction of the rotation stop protrusion of the other positioned protrusions.

4. The accommodating vessel as claimed in claim 1, wherein the at least one positioned protrusion comprises, separately from the rotation stop protrusion in the guide protrusion, abutting protrusion that extends in the same direction as the extending direction of the rotation stop protrusion, and that butts against the positioning protrusion.

5. The accommodating vessel as claimed in claim 1, wherein at least either of the at least one positioned protrusion and the at least one positioning protrusion comprises a guide inclined part that is inclined so as to guide the rotation stop protrusion of the at least one positioned protrusion in a direction for overriding the stop wall of the at least one positioning protrusion in a part where the at least one positioned protrusion of the cover member begins to come into contact with the positioning protrusion of the vessel main body in accordance with the rotation of the cover member.

6. The accommodating vessel as claimed in claim 1, wherein the positioning protrusion of the vessel main body comprises a first positioning protrusion and a second positioning protrusion arranged so as to hold the positioned protrusions of the cover member between the first positioning protrusion and the second positioning protrusion in the pushing and pulling direction of the cover member, and each of the first positioning protrusion and the second positioning protrusion have a width in a direction orthogonal to a rotating direction of the cover member, the width being formed to be narrower as the cover member is more rotated.

7. An image forming device comprising:

an image forming device main body that has a vessel receiving part formed; and an accommodating vessel according to claim 1, the accommodating vessel being detachably attached to the vessel receiving part of the image forming device main body and in which an image forming material is accommodated.

*8. An accommodating vessel, which is detachably attached to a vessel receiving part of a casing of an image forming device to accommodate an image forming material, the accommodating vessel comprising:*

*a first member that includes a first tubular part with one opening opened in a part thereof;*

*a second member that includes a second tubular part with one opening opened in a part thereof, wherein:*

*the first tubular part and the second tubular part form a space for accommodating the image forming material,*

*the second tubular part relatively rotates with respect to the first tubular part in a predetermined rotating direction so that the second member moves to an attaching position, and*

*the second tubular part relatively rotates with respect to the first tubular part in a direction opposite to the predetermined rotating direction so that the second member moves to a detaching position; and*

*a positioning mechanism that positions the first tubular part of the first member and the second tubular part of the second member,*

*wherein the positioning mechanism includes a plurality of first protruding parts, a plurality of second protruding parts, a first rotation stop protrusion and a second rotation stop protrusion,*

*wherein:*

*the plurality of first protruding parts are provided on the first tubular part of the first member,*

*each first protruding part includes a first guide part that protrudes from the first tubular part and extends in the predetermined rotating direction, and*

*the first guide part guides the second tubular part of the second member relatively rotating with respect to the first tubular part of the first member,*

*wherein:*

*the plurality of second protruding parts are provided on the second tubular part of the second member,*

*each second protruding part includes a second guide part that protrudes from the second tubular part and extends in the predetermined rotating direction,*

*the second guide part contacts with one of the first protruding parts to guide the first tubular part of the first member relatively rotating with respect to the second tubular part of the second member, and*

*the second guide part restricts a movement of the first member from the second member in a direction intersecting with the predetermined rotating direction in a state that the second member is positioned in the attaching position, and*

*wherein:*

*the first rotation stop protrusion extends from at least one of the first protruding parts in a direction intersecting with the predetermined rotating direction, and stops the second member from rotating in the predetermined rotating direction,*

*the second rotation stop protrusion extends from at least one of the first protruding parts in another direction intersecting with the predetermined rotating direction, and stops the member from rotating in the direction opposite to the predetermined rotating direction when the first member is detached from the second member, and*

*the first rotation stop protrusion and the second rotation stop protrusion extend in opposing directions.*

*9. An image forming device, comprising:*

*the casing in which the vessel receiving part is formed; and*

*the accommodating vessel according to claim 8,*

*wherein the accommodating vessel is detachably attached to the vessel receiving part of the image forming device, and*

*wherein the accommodating vessel accommodates the image forming material.*

* * * * *